(12) United States Patent
Cho et al.

(10) Patent No.: US 12,149,991 B2
(45) Date of Patent: Nov. 19, 2024

(54) METHOD AND APPARATUS FOR PROVIDING MEC SERVICE

(71) Applicant: Samsung Electronics Co., Ltd., Suwon-si (KR)

(72) Inventors: Chihyun Cho, Suwon-si (KR); Heejung Kim, Suwon-si (KR); Dongyeob Lee, Suwon-si (KR); Junho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 335 days.

(21) Appl. No.: 17/452,718

(22) Filed: Oct. 28, 2021

(65) Prior Publication Data
US 2022/0116831 A1    Apr. 14, 2022

Related U.S. Application Data

(63) Continuation of application No. PCT/KR2021/013688, filed on Oct. 6, 2021.

(30) Foreign Application Priority Data

Oct. 8, 2020    (KR) .................. 10-2020-0130459

(51) Int. Cl.
*H04W 4/50*    (2018.01)
*H04W 8/20*    (2009.01)
(Continued)

(52) U.S. Cl.
CPC ......... *H04W 36/0033* (2013.01); *H04W 4/50* (2018.02); *H04W 8/20* (2013.01);
(Continued)

(58) Field of Classification Search
CPC ..... H04L 41/02–5096; H04L 65/10–80; H04L 67/01–75; H04L 69/02–40;
(Continued)

(56) References Cited

U.S. PATENT DOCUMENTS 10,419,983 B2    9/2019    Zhu et al.
11,431,759 B2    8/2022    Park et al.
(Continued)

FOREIGN PATENT DOCUMENTS

EP    3409044 A1    12/2018
JP    2018037796 A    3/2018
(Continued)

OTHER PUBLICATIONS

3GPP TR 23.758 V1.0.0 (Sep. 2019), Technical Report, 3rd Generation Partnership Project; Technical Specification Group Services and System Aspects; Study on application architecture for enabling Edge Applications; (Release 17); Sep. 2019, 78 pages.
(Continued)

*Primary Examiner* — Timothy J Weidner

(57) ABSTRACT

Provided is a method, performed by a source edge data network, of providing a service in a wireless communication system includes identifying a target edge data network and a handover terminal handed over to the target edge data network among a plurality of terminals provided with the service from the source edge data network; transmitting information about the identified target edge data network to a server; synchronizing status information of an application for providing the service with the target edge data network; and synchronizing user information for each of the plurality of terminals with the target edge data network.

20 Claims, 14 Drawing Sheets

(51) Int. Cl.
*H04W 12/06* (2021.01)
*H04W 28/086* (2023.01)
*H04W 36/00* (2009.01)
*H04W 36/22* (2009.01)
*H04W 56/00* (2009.01)
*H04W 84/02* (2009.01)
*H04W 88/14* (2009.01)
*H04W 92/02* (2009.01)
*H04W 92/24* (2009.01)

(52) U.S. Cl.
CPC ......... *H04W 12/06* (2013.01); *H04W 28/086* (2023.05); *H04W 36/0061* (2013.01); *H04W 36/0072* (2013.01); *H04W 36/22* (2013.01); *H04W 56/001* (2013.01); *H04W 84/02* (2013.01); *H04W 88/14* (2013.01); *H04W 92/02* (2013.01); *H04W 92/24* (2013.01)

(58) Field of Classification Search
CPC ....... H04W 4/02–90; H04W 8/005–30; H04W 12/009–80; H04W 24/02–10; H04W 28/02–26; H04W 36/0005–385; H04W 40/005–38; H04W 48/02–20; H04W 56/0005–0095; H04W 60/005–06; H04W 64/003–006; H04W 76/10–50; H04W 80/02–12; H04W 84/005–22; H04W 88/005–188; H04W 92/02–24
See application file for complete search history.

(56) References Cited

U.S. PATENT DOCUMENTS

2018/0242204 A1* 8/2018 Zhu .................. H04W 36/0033
2019/0191341 A1 6/2019 Trang et al.
2020/0351745 A1* 11/2020 Alnas ................ H04W 36/0009

FOREIGN PATENT DOCUMENTS

| JP | 6554431 B2 | 7/2019 | | |
|---|---|---|---|---|
| KR | 10-2017-0111175 A | 10/2017 | | |
| KR | 10-2020-0084614 A | 7/2020 | | |
| WO | WO-2019011408 A1 * | 1/2019 | ............ | H04W 36/24 |
| WO | WO-2023020707 A1 * | 2/2023 | ............ | H04W 36/18 |

OTHER PUBLICATIONS

3GPP TS 23.558 V0.3.0 (Jun. 2020) Technical Specification, 3rd Generation Partnership Project; Technical Specification Group Services and System Aspects; Architecture for enabling Edge Applications; (Release 17), Jun. 2020, 70 pages.
"Cloud Gaming", Cloud/Network/Software, 4th Industry Diary: Articles about companies and industries; Jan. 2019, 5 pages.
ETSI GS MEC 016 V2.1.1 (Apr. 2019), Group Specification, Multi-access Edge Computing (MEC); UE application Interface, Apr. 2019, 22 pages.
International Search Report and Written Opinion of the International Searching Authority in connection with International Application No. PCT/KR2021/013688 issued Jan. 7, 2022, 22 pages.
3GPP TR 23.748 V1.0.0 (Sep. 2020); Technical Report; 3rd Generation Partnership Project; Technical Specification Group Services and System Aspects; Study on enhancement of support for Edge Computing in 5G Core network (5GC) (Release 17); 232 pages.
Samsung, "Application context relocation initiated by EEC" 3GPP TSG-SA WG6 Meeting #38-e, e-meeting, S6-201055, Jul. 20-31, 2020, 4 pages.
Convida Wireless LLC, "Solutions 20, 21 clean-up and conclusion to Key Issue#9 Preserving Service Continuity" 3GPP TSG-SA WG6 Meeting #34, S6-192066, Reno, Nevada, Nov. 11-15, 2019, 9 pages.
Supplementary European Search Report dated Jan. 3, 2024, in connection with European Patent Application No. 21877988.2, 11 pages.
Draft ETSI GR MEC 035 V2.0.8 (Oct. 2020); Group Report; Multi-access Edge Computing (MEC); Study on Inter-MEC systems and MEC-Cloud systems coordination; Oct. 2020, 40 pages.
ETSI GR MEC 018 V1.1.1 (Oct. 2017); Group Report; Mobile Edge Computing (MEC); End to End Mobility Aspects; Oct. 2017; 52 pages.
ETSI GS MEC 002 V2.1.1 (Oct. 2018) Group Specification; Multi-access Edge Computing (MEC); Phase 2: Use Cases and Requirements, Oct. 2018, 66 pages.

* cited by examiner

METHOD AND APPARATUS FOR PROVIDING MEC SERVICE

CROSS-REFERENCE TO RELATED APPLICATIONS

This application is a continuation and claims priority under 35 U.S.C. § 119 to International Patent Application No. PCT/KR2021/013688 filed on Oct. 6, 2021, which claims priority to Korean Patent Application No. 10-2020-0130459, filed Oct. 8, 2020, in the Korean Intellectual Property Office, the disclosures of which are incorporated by reference herein in their entirety.

BACKGROUND

1. Field

The disclosure relates to a method and apparatus for providing a multi-access edge computing or mobile edge computing (MEC) service, more particularly, a cloud game service.

2. Description of Related Art

Recently, edge computing technology for transmitting data by using an edge server is discussed. The edge computing technology may include, for example, multi-access edge computing (MEC) or fog computing (FOC). The edge computing technology may refer to technology for providing data to an electronic device at a location geographically close to the electronic device, e.g., through a separate server installed inside or near a base station (hereinafter referred to as an "edge data network" or a "MEC server"). For example, an application requiring a low latency among at least one application installed in the electronic device may transmit or receive data through an edge server installed at a geographically close position without using a server connected to an external data network (DN) (e.g., the Internet).

Recently, a service using the edge computing technology (hereinafter referred to as a 'MEC-based service' or "MEC service") is discussed, and research and development have been conducted on electronic devices to support the MEC service. For example, an application installed in an electronic device may exchange edge computing-based data with an edge server (or an application of the edge server) at an application layer.

As research and development is conducted to support MEC services, a method of seamlessly providing a service when a service handover occurs between edge data networks (e.g., MEC servers) providing a MEC service is being discussed. For example, a method of providing a seamless service to a terminal by synchronizing a service status when a handover occurs while a real-time multi-user interactive service, e.g., a game streaming service or a cloud game service, is used by the terminal, is being discussed.

SUMMARY

A terminal should be reconnected to a target edge data network so as to be provided continuously with a service from the target edge data network during use of a multi-access edge computing (MEC) service from a source edge data network. In the case of a multi-user interactive service, status information of other users should be reflected in a service status so that a service may be continuously provided even after a handover occurs.

According to an embodiment of the disclosure, a method, performed by a source edge data network, of providing a service in a wireless communication system includes identifying a target edge data network and a handover terminal handed over to the target edge data network among a plurality of terminals provided with the service from the source edge data network; transmitting information about the identified target edge data network to a server; synchronizing status information of an application for providing the service with the target edge data network; and synchronizing user information for each of the plurality of terminals with the target edge data network.

According to another embodiment of the disclosure, a method, performed by a target edge data network, of providing a service in a wireless communication system includes receiving, from a server, information regarding the service to be deployed; connecting to a handover terminal handed over to the target edge data network among a plurality of terminals provided with the service from a source edge data network; synchronizing status information of an application for providing the service with the source edge data network; synchronizing user information for each of the plurality of terminals with the source edge data network; and executing the application.

According to another embodiment of the disclosure, a source edge data network providing a service to a terminal in a wireless communication system includes a communicator; a memory storing a plurality of instructions; and at least one processor configured to execute the plurality of instructions to identify a target edge data network and a handover terminal among a plurality of terminals connected to the source edge data network, transmit information about the identified target edge data network to a server, synchronize status information of an application for providing the service with the target edge data network, and synchronize user information for each of the plurality of terminals with the target edge data network.

According to another embodiment of the disclosure, a target edge data network providing a service to a terminal in a wireless communication system includes a communicator; a memory storing a plurality of instructions; and at least one processor configured to execute the plurality of instructions to receive, from a server, information regarding the service to be deployed, connect to a handover terminal handed over to the target edge data network among a plurality of terminals provided with the service from a source edge data network, synchronize status information of an application for providing the service with the source edge data network, synchronize user information for each of the plurality of terminals with the source edge data network, and execute the application.

According to another embodiment of the disclosure, a non-transitory computer-readable recording medium having recorded thereon a program for executing the above-described method in a computer is provided.

In addition, other methods and systems for implementing the disclosure and a non-transitory computer readable recording medium having recorded a computer program for executing the methods are provided.

The disclosure provides a method of reconnecting a terminal to a target edge data network when the terminal is handed over from a source edge data network to the target edge data network, and application status information and user information can be synchronized and updated while being distinguished between each other, and updated, thereby seamlessly providing a service in a multi-user service environment without disconnection due to the handover.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
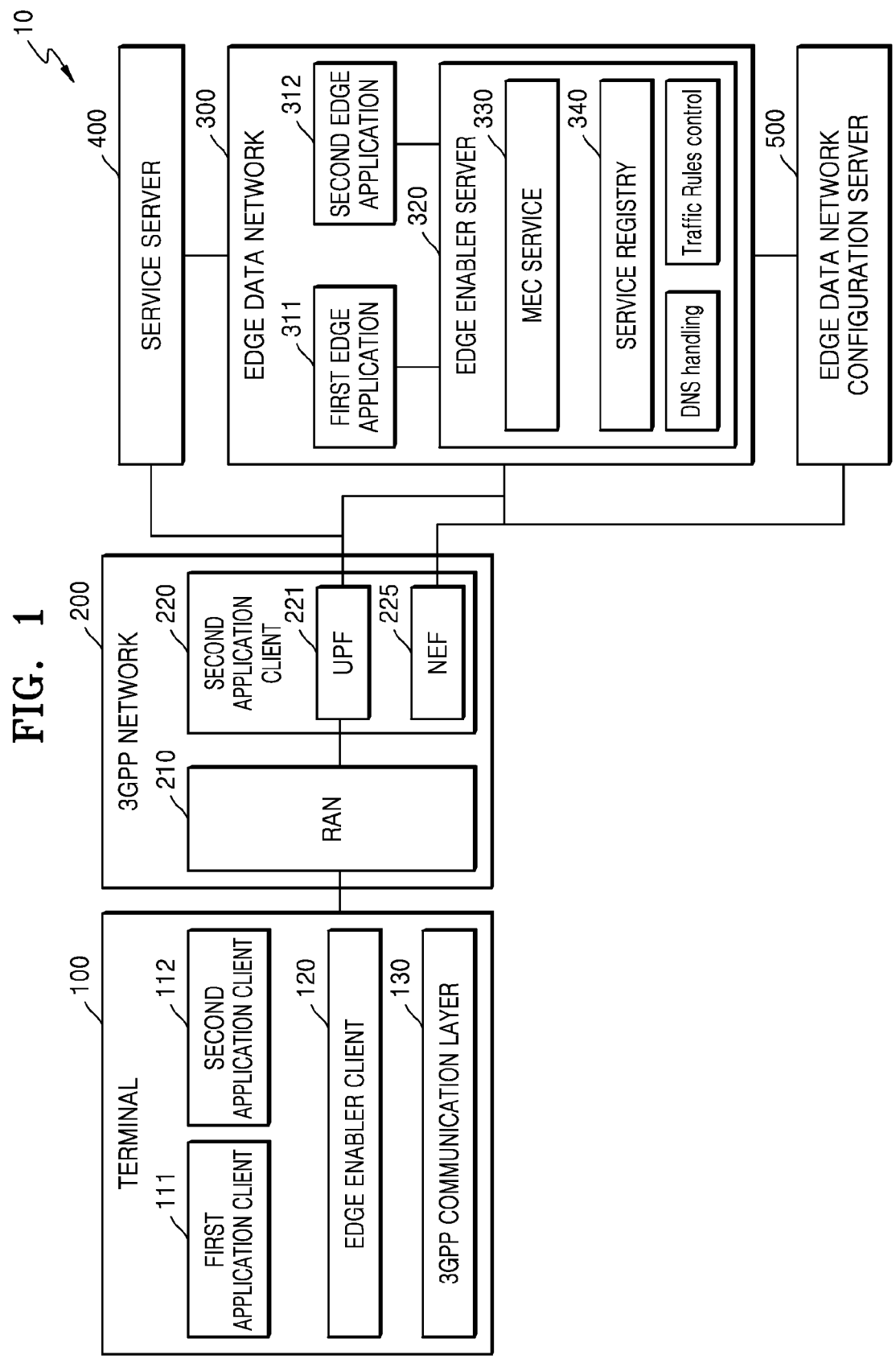
FIG. 1 is a diagram for briefly describing a network environment for supporting a multi-access edge computing (MEC) service, according to an embodiment of the disclosure.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Throughout the disclosure, the expression "at least one of a, b or c" indicates only a, only b, only c, both a and b, both a and c, both b and c, all of a, b, and c, or variations thereof.

Hereinafter, embodiments of the disclosure will be described in detail with reference to the accompanying drawings.

When embodiments of the disclosure are described herein, a description of techniques which are well known in the technical field to which the disclosure pertains and are not directly related to the disclosure will be omitted. This is to more clearly convey the gist of the disclosure by omitting unnecessary description.

For the same reason, some components are exaggerated, omitted, or schematically illustrated in the accompanying drawings. The size of each component does not entirely reflect the actual size thereof. The same reference numerals are allocated to the same or corresponding elements in each drawing.

Advantages and features of the disclosure and methods of achieving them will be apparent from embodiments of the disclosure described in detail below, in conjunction with the accompanying drawings. However, the disclosure is not limited to the embodiments of the disclosure below and may be embodied in many different forms. Rather, the embodiments of the disclosure are provided so that this disclosure will be thorough and complete and will fully convey the concept of the disclosure to those of ordinary skill in the art. The disclosure should be defined by the scope of the claims. The same reference numerals refer to the same components throughout the specification.

In this case, it will be understood that each block of process flowcharts and combinations of the flowcharts may be performed by computer program instructions. The computer program instructions may be installed in a processor of a general-purpose computer, special-purpose computer, or other programmable data processing equipment, so that means to perform functions described in blocks of each flowchart may be produced by instructions executed by the processor of the computer or the other programmable data processing equipment. The computer program instructions may be stored in a computer usable or readable memory oriented to a computer or other programmable data processing equipment to implement functions in a particular way. Thus, an article of manufacture, including an instruction means for performing the function described in a block (or blocks) of each flowchart, may be produced by the instructions stored in the computer usable or readable memory. Because the computer program instructions may be stored in a computer or other programmable data processing equipment, the functions of the blocks of each flowchart may be provided by the instructions performing a series of operations in the computer or the other programmable data processing equipment to produce a process executable by the computer to generate a computer programmable instructions to operate the computer or the other data processing equipment.

In addition, each block may represent a module, segment, or part of code that includes one or more executable instructions for executing specified logical function(s). It should be noted that in some alternative embodiments of the present disclosure, the functions described in the blocks may be performed in an order different from that described herein. For example, two blocks illustrated consecutively may be performed substantially simultaneously or performed in a reverse order according to functions corresponding thereto in some cases.

In this case, the term 'unit' used in embodiments set forth herein represents software or hardware components such as FPGA or ASIC, and a '~ unit' performs certain roles. However, the term "unit" is not limited to software or hardware. The term "unit" may be configured to be stored in an addressable storage medium or to reproduce one or more processors. Thus, the term "unit" may include, for example, components, such as software components, object-oriented software components, class components, and task components, processes, functions, attributes, procedures, subroutines, segments of program code, drivers, firmware, microcode, a circuit, data, database, data structures, tables, arrays, and parameters. Components and functions provided in "units" may be combined to a smaller number of components and "units" or may be divided into sub-components and "sub-units". In addition, the components and "units" may be implemented to execute one or more CPUs in a device or a secure multimedia card. In embodiments of the disclosure, a "unit" may include one or more processors.

Hereinafter, the disclosure will be described in detail with reference to the accompanying drawings.

FIG. 1 is a diagram for briefly describing a network environment for supporting a multi-access edge computing (MEC) service according to an embodiment of the disclosure.

Referring to FIG. 1, a network environment 10 may include a terminal 100, a 3rd Generation Partnership Project (3GPP) network 200, an edge data network 300, a service server 400, and an edge data network configuration server 500. However, components included in the network environment 10 is not limited thereto.

According to an embodiment of the disclosure, each of the components included in the network environment 10 may be understood to mean a physical entity or a software or module unit for performing an individual function. Therefore, the components included in the network environment 10 may be referred to as entities or functions.

According to an embodiment of the disclosure, the terminal 100 may be understood to mean a device used by a user. For example, the terminal 100 may refer to a user terminal (UE), a remote terminal, a wireless terminal, or a user device. Alternatively, the terminal 100 may include all types of devices. For example, the terminal 100 may include a drone, an autonomous car, an augmented reality (AR) device, a virtual reality (VR) device, a mobile phone, a smart phone, and the like.

According to an embodiment of the disclosure, the terminal 100 may drive (or execute) a plurality of application clients. For example, the terminal 100 may include a first application client 111 and a second application client 112. The plurality of application clients may require different network services, based on at least one of a data transmission rate of the terminal 100, a latency, reliability, the number of terminals 100 accessing a network, a network access period of the terminal 100, or an average data usage. The different network services may include, for example, an enhanced mobile broadband (eMBB), ultra-reliable and low latency communication (URLLC), or massive machine type communication (mMTC).

An application client of the terminal 100 may refer to a basic application installed in advance in the terminal 100 or an application provided by a third party. That is, the application client of the terminal 100 may refer to a client application program driven in the terminal 100 for a certain application service. Multiple application clients may be driven in the terminal 100.

At least one of the application clients may be used to provide an edge computing service to the terminal 100 from the edge data network 300. For example, an application client may be an application installed and executed in the terminal 100 and may provide a function of transmitting or receiving data through the edge data network 300. An application client of the terminal 100 may refer to application software (or module) executed in the terminal 100 to use a function provided by one or more certain edge applications.

According to an embodiment of the disclosure, the plurality of application clients 111 and 112 of the terminal 100 may perform data transmission with the service server 400 or perform edge computing-based data transmission with the edge data network 300, based on a required network service type. For example, when the first application client 111 does not require a low latency, the first application client 111 may perform data transmission with the service server 400. As another example, when the second application client 112 requires a low latency, the second application client 112 may perform MEC-based data transmission with the edge data network 300. However, embodiments of the disclosure are not limited thereto, and the terminal 100 may determine whether to perform data transmission and reception with the service server 400 or the edge data network 300, based on various conditions other than the latency.

According to an embodiment of the disclosure, the application client of the terminal 100 may be referred to as a UE application, an application client, or a client application. For convenience of description, the application client of the terminal 100 will be hereinafter referred to as an application client.

According to an embodiment of the disclosure, the terminal 100 may include an edge enabler client 120 and a 3GPP communication layer 130. According to an embodiment of the disclosure, the edge enabler client 120 may refer to a layer of the terminal 100 at which an operation of the terminal 100 is performed to allow the terminal 100 to use an edge computing service. According to an embodiment of the disclosure, the edge enabler client 120 may also be referred to as an MEC Enabling Layer (MEL). The edge enabler client 120 may determine which UE application is to be used to use the edge computing service and connect the edge data network 300 providing the edge computing service to a network interface so as to transmit data of the application client of the terminal 100 to the edge data network 300.

In addition, the edge enabler client 120 may perform data connection with the 3GPP communication layer 130 so as to allow the terminal 100 to use a MEC service. The 3GPP communication layer 130 may refer to a layer for performing a modem operation to use a mobile communication system, and may establish wireless connection for data communication, register the terminal 100 to a mobile communication system, perform connection to the mobile communication system to transmit data, and transmit or receive data.

According to an embodiment of the disclosure, the 3GPP network 200 is a wireless communication system subject to the 3GPP standard and may be connected to the terminal 100 to provide a wireless communication service to the terminal 100. The 3GPP network 200 may include a 3rd generation (3G) network, an LTE network, an LTE-A network, and a next generation network (5G or NR). However, embodiments of the disclosure are not limited to the above examples, and the 3GPP network 200 of the disclosure may include a network configured according to a different communication technology.

According to an embodiment of the disclosure, the 3GPP network 200 may include a radio access network (RAN) 210 and a core network 220. According to an embodiment of the disclosure, the RAN 210 of the 3GPP network 200 is a network directly connected to the terminal 100 and is an infrastructure that provides wireless connection to the terminal 100. The RAN 210 may include a plurality of base stations, and the plurality of base stations may perform communication via interfaces connected thereto. At least some of the interfaces between the plurality of base stations may be wired or wireless interfaces. A base station may be referred to as a gNode B, an eNode B, a node B, a base station (BS), a wireless connection unit, a base station controller, a node in a network, or a different term having a technical meaning equivalent thereto.

According to an embodiment of the disclosure, the core network 220 of the 3GPP network 200 may process data about the terminal 100 and control signals, which are transmitted or received via the RAN 210. The core network 220 may perform various functions, such as control of a user plan and a control plane, processing of a mobility, management of subscriber information, billing, and interworking with other types of systems (e.g., a Long-Term Evolution (LTE) system). To perform the various functions described above, the core network 220 may include a plurality of entities having different network functions (NFs) and separated from each other according to functions.

For example, the core network 220 may include a user plane function (UPF) 221, an access and mobility management function (AMF) (not shown), a session management function (SMF) (not shown), a policy control function (PCF) (not shown), a network exposure function (NEF) 225, a user data management (UDM) (not shown), a network data analysis function (NWDAF) (not shown), and a gateway mobile location center (GMLC) (not shown).

The UPF 221 may provide a data path (or a data plane) between the terminal 100 and the edge data network 300. That is, the UPF 221 may function as a gateway that transmits data (or a data packet) transmitted from or received by the terminal 100.

The terminal 100 and the edge data network 300 may transmit data (or data packets) to or receive data (data packets) from each other through the UPF 221. The edge data network 300 may transmit data to and receive data from the UPF 221 through a data network (DN). The UPF 221 may be located near the edge data network 300 to support a MEC service to the terminal 100, and may transmit a data packet from the terminal 100 to the edge data network 300 with a low latency or transmit a data packet from the edge data network 300 to the terminal 100 with a low latency.

The UPF 221 may be connected to a data network connected between the terminal 100 and the service server 400 through the Internet. The UPF 221 may route a data packet, which is to be transmitted through the Internet among data packets transmitted from the terminal 100, to the data network between the service server 400 and the terminal 100.

The NEF 225 is an NF that exposes capabilities and services of NFs of the 3GPP network 200 to the outside. The NEF 225 may be connected to an external server (e.g., the edge data network 300) to transmit information about an event occurring an NF inside the 3GPP network 200 to the external server or transmit information about an event requested by the external server to the NF. Examples of a function and a service exposed through the NEF 225 to the outside may include reporting an event related to a position of the terminal 100, reporting an event related to a session of the terminal 100, reporting an event related to management of mobility of the terminal 100, etc. The external server may subscribe to the function and services of the NEF 225 to access the functions and services.

According to an embodiment of the disclosure, the edge data network 300 may refer to a server connected to the terminal 100 using an edge computing service. The edge data network 300 may be located inside a base station of the 3GPP network 200 to which the terminal 100 is connected or at a location geographically close to the base station, and may provide services, at least some of which are the same as services provided from the service server 400. In an embodiment of the disclosure, MEC may stand for multi-access edge computing or mobile-edge computing.

According to an embodiment of the disclosure, the edge data network 300 may be referred to as an MEC server, an MEC host, an edge computing server, a mobile edge host, an edge computing platform, or the like.

According to an embodiment of the disclosure, the edge data network 300 may include and execute (or drive) a plurality of edge applications. For example, the edge data network 300 may execute a first edge application 311 and a second edge application 312. According to an embodiment of the disclosure, an edge application may refer to an application provided by a third party located in the edge data network 300 providing an edge computing service. The edge application may be used to form a data session with an application client so as to transmit or receive data related to the application client. That is, the edge application may form a data session with an application client. According to an embodiment of the disclosure, the data session may refer to a communication path formed by the application client of the terminal 100 and the edge application of the edge data network 300 to transmit or receive data.

According to an embodiment of the disclosure, the edge data network 300 may provide virtual resources to the edge application. The virtual resources may include, for example, at least one of a computing resource, a storage resource, or a network resource (e.g., a network bandwidth), which is available to the edge application. The edge application of the edge data network 300 may be executed (or driven) by a virtual machine.

According to an embodiment of the disclosure, an application of the edge data network 300 may be referred to as an edge application, a MEC application (app), or an edge application server. For convenience of description, the application of the edge data network 300 will be hereinafter referred to as an edge application.

According to one embodiment, the edge data network 300 may include an edge enabler server 320. According to an embodiment of the disclosure, the edge enabler server 320 may be referred to as a mobile edge computing platform, a mobile edge platform (MEP), a platform, or the like.

According to an embodiment of the disclosure, the edge enabler server 320 may provide a function required for execution of the edge application. For example, the edge enabler server 320 may provide a function or an environment allowing the edge application to provide an edge computing service to the terminal 100 or to consume the edge computing service. In addition, the edge enabler server 320 may perform traffic control or domain name system (DNS) handling.

According to an embodiment of the disclosure, a procedure and information-related services required to consume the edge application may be referred to together as the edge computing service. The edge computing service may be provided or consumed by the edge enabler server 320 or the edge application. For example, the edge application may provide an edge computing service to the terminal 100 or may consume an edge computing service provided from the edge enabler server 320 to provide the edge computing service to the terminal 100. The edge enabler server 320 may provide the edge application with an edge computing service that may be consumed by the edge application to provide an edge computing service to the terminal 100. An edge computing service may be hereinafter understood to mean a service provided to the terminal 100 from the edge data network 300 or the edge application or a service provided from the edge enabler server 320 to be consumed by the edge application.

According to an embodiment of the disclosure, the edge enabler server 320 may provide an edge computing service to the edge application. For example, the edge enabler server 320 may provide various information (data, content, etc., for example, information about the location of the terminal 100, caching data, information about a service that is subscribed to, etc.) to the edge application according to the type of an edge computing service provided. The edge application may provide the terminal 100 with an edge computing service by using the edge computing service provided by the edge enabler server 320. For example, the edge application may provide the terminal 100 with an edge computing service, based on information provided as an edge computing service by the edge enabler server 320. The edge computing service provided to the terminal 100 may be a service necessary for the terminal 100 to drive an application client (e.g., a service providing data necessary to drive the application client). Hereinafter, providing the edge computing service to the terminal 100 by the edge data network 300 should be understood to mean providing by the edge application of the edge data network 300 an edge computing service necessary for the terminal 100 to drive the application client.

According to an embodiment of the disclosure, the edge enabler server 320 may include a MEC service 330 and a service registry 340. The MEC service 330 may provide an edge computing service to edge applications included in the edge data network 300. The MEC service 330 may be embodied as software or a module for performing an individual function. The service registry 340 may provide information about an edge computing service available to the edge data network 300.

According to an embodiment of the disclosure, the edge enabler server 320 may register an edge application therein when the edge application is instantiated. The edge enabler server 320 may register the edge application and store information related to the edge application. The information related to the edge application stored in the edge enabler server 320 may include information about an edge computing service to be provided to the terminal 100 or the like from the edge application, information as to whether the edge computing service is a service required for the edge application or an optional service, and the like.

According to an embodiment of the disclosure, the edge application may register a new edge computing service with the edge enabler server 320, update an already registered edge computing service, or search for an edge computing service registered with the edge enabler server 320. The edge application may provide the edge enabler server 320 with information about an edge computing service to be registered or updated while registering the edge computing service with the edge enabler server 320 or updating the edge computing service. The edge enabler server 320 may register the edge computing service with the service registry 340.

According to an embodiment of the disclosure, the edge enabler server 320 may transmit information about edge computing services registered with the service registry 340 to the edge application in the edge data network 300. For example, the edge enabler server 320 may transmit a list of edge computing services registered with the service registry 340 to the edge application. In addition, the edge enabler server 320 may transmit information about availability of edge computing services registered with or to be newly registered with the service registry 340 to the edge application.

According to an embodiment of the disclosure, the edge application may subscribe to an edge computing service registered with the service registry 340. The edge application may subscribe to the edge computing service by transmitting information requesting a subscription to the edge computing service to the edge enabler server 320. The subscribing by the edge application to the edge computing service may be understood to mean the edge computing service or information about on the edge computing service is constantly provided from the edge enabler server 320.

According to an embodiment of the disclosure, the service server 400 may provide content related to the application client of the terminal 100.

As described above, the plurality of clients 111 and 112 of the terminal 100 may perform data transmission with the service server 400, based on the type of a network service required. For example, when the first application client 111 does not require a low latency, the first application client 111 may perform data transmission with the service server 400. However, embodiments of the disclosure are not limited thereto, and the terminal 100 may determine whether to perform data transmission and reception with the service server 400 or the edge data network 300, based on various conditions other than the latency.

The service server 400 may provide a service or data necessary for the terminal 100 to drive (or execute) the application client, and provide the edge data network 300 with an edge application for providing an edge computing service to the application client of the terminal 100. In addition, the service server 400 may provide the edge data network 300 with the service or data necessary for the terminal 100 to drive (or execute) the application client. The service server 400 may be operated or managed by a content provider who provides content to the terminal 100.

The edge data network configuration server 500 may provide support functions for connecting the terminal 100 to the edge enabler server 320.

According to an embodiment of the disclosure, the edge data network configuration server 500 may refer to an initial connection server that may provide the terminal 100 with edge data network configuration information for using an edge computing service. The deployment of edge data networks may be known to the edge data network configuration server 500, and the terminal 100 may be connected to the edge data network configuration server 500 to receive configuration information needed to use the edge computing service, e.g., information about an edge data network to be connected to at a certain location.

According to an embodiment of the disclosure, the edge data network configuration server 500 may provide the edge data network configuration information to the edge enabler client 120. For example, the edge data network configuration information may include information necessary for the terminal 100 to be connected to the edge data network 300 by using a service region information (information about an edge data network providing a service to a certain region or the like), and information for establishing connection with the edge enabler server 320 (information identifying the edge data network, etc.).

The edge data network configuration server 500 may be referred to as an edge data network management server, an edge configuration server, a configuration server, or the like, and may perform functions of a mobile edge platform manager (MEPM) or a multi-access edge orchestrator (MEO).

According to an embodiment of the disclosure, the edge data network configuration server 500 may refer to a MEC management proxy (MMP) server or a domain name system (DNS) server.

Figure 2:
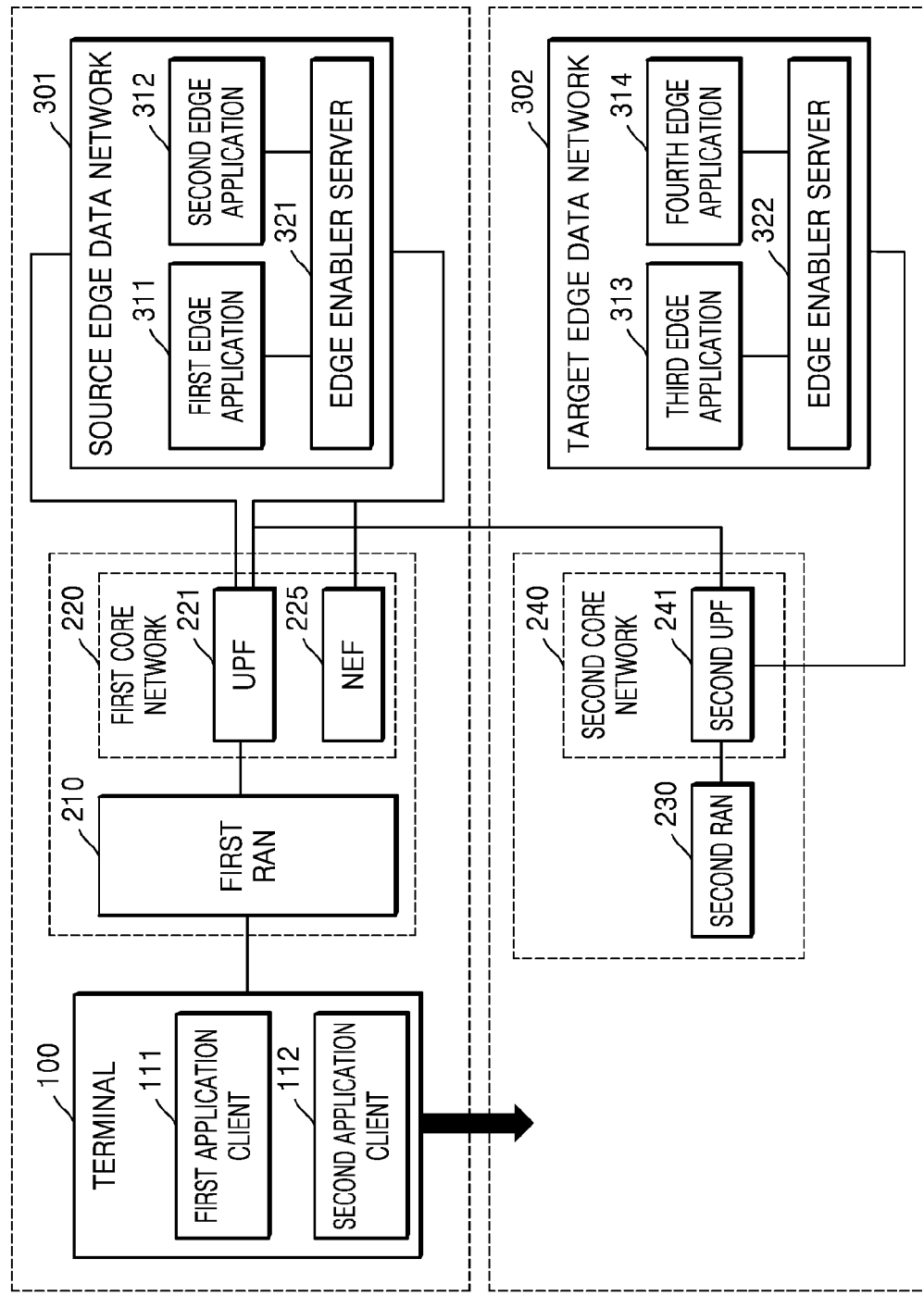
FIG. 2 is a diagram illustrating a network environment for supporting a MEC service when a terminal performs a handover, according to an embodiment of the disclosure.

FIG. 2 is a diagram illustrating a network environment for supporting a MEC service when a terminal performs a handover according to an embodiment of the disclosure.

Referring to FIG. 2, a terminal 100 may be located within a service providing area of a source edge data network 301, and may be provided with a service from the source edge data network 301. The terminal 100 may be moved from the service providing area of the source edge data network 301 to a service providing area of a target edge data network 302, and thus a handover may occur from the source edge data network 301 to the target edge data network 302 due to the movement of the terminal 100.

A terminal's handover to a target edge data network from a source edge data network may be understood to mean a technique for changing an edge data network providing the terminal with a service from the source edge data network to the target edge data network. A terminal's handover (or performing a handover) to the target edge data network may be understood to mean performing a process of changing an edge data network providing the terminal with a service from the source edge data network to the target edge data network.

More specifically, a method of performing a handover may be understood as relocating application (APP) context (or an application instance) for the terminal from an edge application (i.e., a source edge application) of a source edge data network to an edge application (i.e., a target edge application) of a target edge data network.

The edge data network providing a service to the terminal may be changed from the source edge data network to the target edge data network through a handover, and the terminal may be continuously provided with a service through a handover to another edge data network even when the terminal is out of a service providing area of the edge data network to which the terminal is connected.

Hereinafter, a source edge data network may refer to an edge data network currently connected to a terminal to provide a service to the terminal, and a source edge application may refer to an edge application of the source edge data network. A target edge data network may refer to an edge data network providing a service to the terminal after a handover is performed, and a target edge application may refer to an edge application of the target edge data network. Here, the target edge application may be an edge application that provides the same service as the source edge application.

A service providing area of the edge data network may refer to coverage of an edge data network to provide a service to terminals. The coverage of the edge data network to provide a service to terminals may be determined by a location, communication capability, and edge service providing capability (e.g., the type of services to be provided) of the edge data network. Here, the communication capability of the edge data network may be determined by communication capability (e.g., transmission/reception intensity) of a base station connected to the edge data network. Service providing areas of edge data networks may be different from each other, and a handover may be performed as a terminal is moved between the service providing areas of the edge data networks.

Referring to FIG. 2, the terminal 100 may execute (or drive) a first application client 111 and a second application client 112. The terminal 100 may transmit or receive data related to the first application client 111 with the source edge data network 301 or a first edge application 311 through a first RAN 230 and a first UPF 241.

According to an embodiment of the disclosure, the first core network 240 is a core network connected to the first RAN 230 and the source edge data network 301. The first core network 240 may include the first UPF 241 and a first NEF 245, and may further include other network entities.

According to an embodiment of the disclosure, the first UPF 241 may provide a data path (or a data plane) between the terminal 100 and the source edge data network 301. That is, the first UPF 241 may function as a gateway that transmits data (or a data packet) transmitted from or received by the terminal 100. According to an embodiment of the disclosure, the first NEF 245 may be connected to the source edge data network 301 to transmit an event or information generated from an inner network function (NF) of a 3GPP network to the source edge data network 301 or transmit an event or information requested by the source edge data network 301 to the inner NF.

According to an embodiment of the disclosure, the source edge data network 301 is an edge data network connected to the terminal 100 to provide a service to the terminal 100. To this end, the source edge data network 300 may be located at a position close to the first RAN 230 to which the terminal 100 is connected.

According to an embodiment of the disclosure, the source edge data network 301 may execute a plurality of edge applications (the first edge application 311 and a second edge application 312), and include an edge enabler server 321. However, a configuration of the source edge data network 301 is not limited thereto. Referring to FIG. 2, the first edge application 311 may form a data session with the first application client 111 of the terminal 100. The first edge application 311 may provide a service to the first application client 111, and transmit data for providing the service. In the disclosure, transmitting a service or data for providing a service to the terminal 100 from the source edge data network 301 may be understood as providing a service or data for providing the service to an application client (e.g., the first application client 111) of the terminal from an edge application (e.g., the first edge application 311) of the source edge data network 301.

According to an embodiment of the disclosure, the source edge data network 301 may obtain location information of the terminal 100. For example, the source edge data network 301 may receive the location information of the terminal 100 from at least one of the terminal 100 or a 3GPP network entity connected to the terminal 100. The location information of the terminal 100 may include information about a current location of the terminal 100, information about a location change, information about a moving path, etc.

According to an embodiment of the disclosure, the source edge data network 301 may transmit a message requesting the location information of the terminal 100 to the terminal 100, and receive the location information of the terminal 100 from the terminal 100. The location information of the terminal 100 that may be received from the terminal 100 may include location information of the terminal 100 obtained by the terminal 100 through a global positioning system (GPS). In this case, the location information of the terminal 100 transmitted from the terminal 100 may be transmitted to the source edge data network 301 via the first RAN 230 and the first UPF 241.

According to an embodiment of the disclosure, the source edge data network 301 may receive the location information of the terminal 100 from a 3GPP network entity connected to the terminal 100. For example, the source edge data network 301 may transmit a message requesting a subscription to reporting an event related to a location of the terminal 100 exposed by the first NEF 245 connected to a 3GPP network connected to the terminal 100 (e.g., a current location of the terminal 100, a location change, a location of the terminal 100 in a certain situation, etc.), and receive a message reporting an event related to a location of the terminal 100 from the first NEF 245. The event related to the location of the terminal 100 may include an event related to the location of the terminal 100 detected by an AMF 222 or a GMLC 228 of a 3GPP network 200.

According to an embodiment of the disclosure, the message reporting the event related to the location of the terminal 100 may include, as the location information of the terminal 100, GPS information of the terminal 100, information about a region in which the terminal 100 is located, information about a cell connected to the terminal 100, etc.

According to an embodiment of the disclosure, the location information of the terminal 100 may be obtained using an edge computing service (e.g., a location service providing location information of the terminal 100, etc.) provided by the edge enabler server 320 of the source edge data network 301.

According to an embodiment of the disclosure, information about the location of the terminal 100 obtained by the source edge data network 301 may be a combination of information about the location of the terminal 100 received from the first NEF 245 and information received from the terminal 100.

According to an embodiment of the disclosure, the source edge data network 301 may identify a moving path of the terminal 100, based on the obtained location information of the terminal 100. The moving path of the terminal 100 may be a path along which the terminal 100 is moving from a current position, and may be an actual or estimated moving path of the terminal 100.

For example, the source edge data network 301 may identify the moving path of the terminal 100 by combining information about a current location of the terminal 100 included in the obtained location information of the terminal 100 and information about a change of the location of the terminal 100. Alternatively, the source edge data network 301 may receive information about the moving path of the terminal 100 as the location information of the terminal 100 from the terminal 100 or a 3GPP network entity connected to the terminal 100 (that is, the information about the moving path of the terminal 100 may be included in the location information of the terminal 100), and identify the moving path of the terminal 100, based on the information about the moving path.

According to an embodiment of the disclosure, the source edge data network 301 may identify the target edge data network 302 to which the terminal 100 is expected to be handed over, based on the location information of the terminal 100. For example, the source edge data network 301 may identify the moving path of the terminal 100, based on the obtained location information of the terminal 100, and determine that the terminal 100 will be moved to a certain region, based on the identified moving path of the terminal 100. As the terminal 100 is moved to a certain region, the source edge data network 301 may expect that a handover will be performed to an edge data network providing a service to the region. The source edge data network 301 may determine the edge data network that provides the service to the region as the target edge data network 302.

According to another embodiment of the disclosure, the source edge data network 301 may identify the target edge data network 302 to which the terminal 100 is expected to be handed over, based on the intensities of signals received by the terminal 100 from RANs or transmitted to RANs. For example, the source edge data network 301 may receive information about the intensity of a signal transmitted by the terminal 100 to or received from the first RAN 230 or another RAN (e.g., the second RAN 250) from the first RAN 230, the terminal 100, or the like. The source edge data network 301 may identify the target edge data network 302 to which the terminal 100 is expected to be handed over, based on a change of the intensity of signal transmitted by the terminal 100 to or received from the first RAN 230 currently connected to the terminal 100, the intensity of a signal transmitted to or received from another RAN, etc.

According to an embodiment of the disclosure, the source edge data network 301 may search for an edge data network that provides a service to a certain region (i.e., the target edge data network 302). For example, the source edge data network 301 may search for the target edge data network 302, based on at least one of the location information of the terminal 100 (e.g., information about a region, information about a cell, etc.), information about the moving path of the terminal 100, or information about a certain region (e.g., information about a cell in the region).

More specifically, the source edge data network 301 may request an edge data network configuration server (EDN CS) or a domain name system (DNS) server to provide information about the target edge data network 302, and receive information about the target edge data network 302 (e.g., an identifier, an Internet protocol (IP) address, etc. of the target edge data network 302). The source edge data network 301 may identify an edge data network that provides a service to a certain region, based on the received information, and determine the identified edge data network as the target edge data network 302. The EDN CS will be described with reference to FIG. 3 below. According to an embodiment of the disclosure, the target edge data network 302 is an edge data network that provides a service to the terminal 100 after the terminal 100 performs a handover. The target edge data network 302 may be located at a position close to the second RAN 250.

According to an embodiment of the disclosure, the target edge data network 302 may execute a plurality of edge applications (a third edge application 313 and a fourth edge application 314), and include an edge enabler server 322. However, a configuration of the target edge data network 302 is not limited thereto. Referring to FIG. 2, the edge applications of the target edge data network 302 may not form a data session with the application clients of the terminal 100.

According to an embodiment of the disclosure, the second core network 260 is a core network connected to the second RAN 250 and the target edge data network 302. The second core network 260 may include a second UPF 261 and may further include other network entities. The second UPF 261 may provide a data path between the terminal 100 and the target edge data network 302 after a handover is performed.

According to an embodiment of the disclosure, when the terminal 100 performs a handover to the target edge data network 302 from the source edge data network 301, an APP context (or an application instance) of the source edge data network 301 for the terminal 100 may be relocated from the source edge data network 301 to the target edge data network 302. For example, as the terminal 100 performs the handover, the APP context (or application instance) for the terminal 100 of the first edge application 311 providing a service to the terminal 100 may be transmitted from the source edge data network 301 to the target edge data network 302.

The target edge data network 302 may provide the service, which is provided by the first edge application 311, to the terminal 100, based on the APP context (or application instance) for the terminal 100, which is received from the source edge data network 301. For example, the target edge data network 302 may execute an edge application (e.g., the third edge application 313) corresponding to the first edge application 311, based on the received APP context (or application instance), and the executed edge application may provide the terminal 100 with the service provided by the first edge application 311. The target edge data network 302 may obtain data related to an identified service to be provided to the terminal 100 after a handover, based on the location information of the terminal 100 (e.g., the moving path of the terminal 100). The target edge data network 302 may determine an expected location or moving path of the terminal 100 in a service providing area of the target edge data network 302 after a handover, based on the location information of the terminal 100 (e.g., the moving path of the terminal 100). The target edge data network 302 may obtain data related to the service to be provided to the terminal 100, based on the expected location or moving path of the terminal 100 in the service providing area.

In this case, the target edge data network 302 may request the service server 400 to provide data related to the service and receive the data. Alternatively, the target edge data network 302 may obtain the data related to the service through an edge application (e.g., the third edge application 313) that may provide an identified service. That is, the data related to the service may be obtained through an operation of the edge application, which may provide an identified service, to provide the service.

Figure 3:
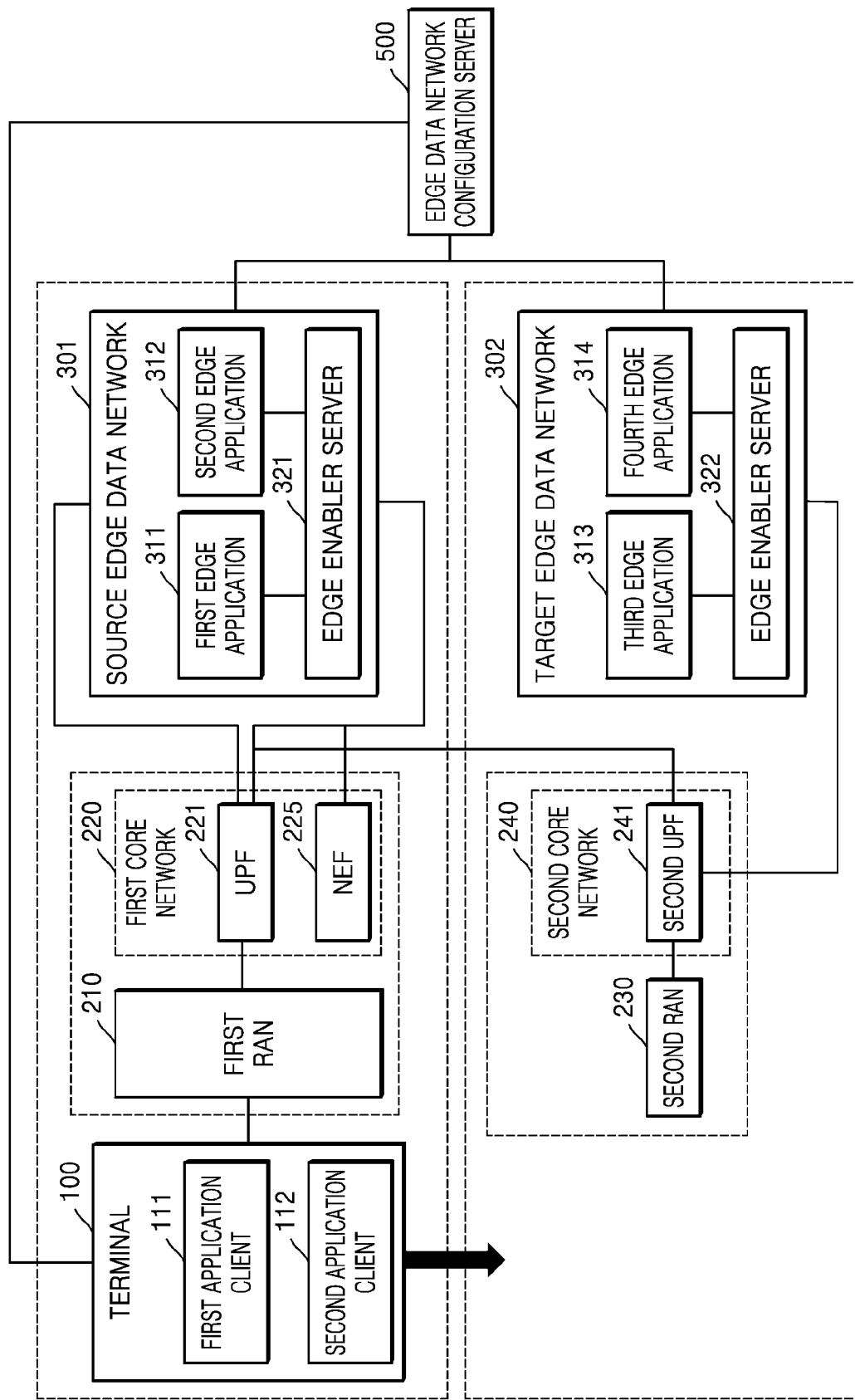
FIG. 3 is a diagram illustrating a network environment for supporting a MEC service when a terminal performs a handover, according to another embodiment of the disclosure.

FIG. 3 is a diagram illustrating a network environment for supporting a MEC service when a terminal performs a handover according to another embodiment of the disclosure.

In the network environment of FIG. 3 further includes an edge data network configuration server 500, compared to the network environment described above with reference to FIG. 2.

According to an embodiment of the disclosure, the edge data network configuration server 500 may be connected to edge data networks (e.g., a source edge data network 301 and a target edge data network 302) and a terminal 100. The edge data network configuration server 500 may be an initial connection server from which the terminal 100 may receive configuration information for using an edge computing service. For example, the edge data network configuration server 500 may provide edge data network configuration information to an edge enabler client 120 of the terminal 100. For example, when receiving a message requesting to generate APP context related to application clients 111 and 112 from the terminal 100, the edge data network configuration server 500 may transmit a message requesting to distribute an edge application corresponding to the application clients 111 and 112 to an edge data network.

Here, the edge data network configuration information includes information for connecting to the edge data networks 301 and 302, information for connecting to edge enabler servers 321 and 322 such as a Uniform Resource Identifier (URI), and the like. The edge data network configuration server 500 may be referred to as an edge data network management server, an edge configuration server, a configuration server, or the like, and may perform functions of a mobile edge platform manager (MEPM) or a multi-access edge orchestrator (MEO).

According to an embodiment of the disclosure, the edge data network configuration server 500 may identify the target edge data network 302 to which the terminal 100 is expected to be handed over. For example, the edge data network configuration server 500 may receive location information of the terminal 100, information about a service providing area, information about the intensities of signals exchanged among the terminal 100, the source edge data network 301, and the target edge data network 302, and the like from the terminal 100, the source edge data network 301, and the target edge data network 302. The edge data network configuration server 500 may identify the target edge data network 302 as an edge data network to which the terminal 100 is expected to be handed over, based on the received information. The edge data network configuration server 500 may transmit identification information of the identified target edge data network 302 to the source edge data network 301.

According to an embodiment of the disclosure, the edge data network configuration server 500 may receive, from the source edge data network 301, a message requesting to identify the target edge data network 302 to which the terminal 100 is expected to be handed over. The message may include information about the location of the terminal 100. The edge data network configuration server 500 may identify the target edge data network 302 as an edge data network to which the terminal 100 is expected to be handed over and transmit the identification information of the identified target edge data network 302 to the source edge data network 302, in response to a request from the source edge data network 301.

Figure 4:
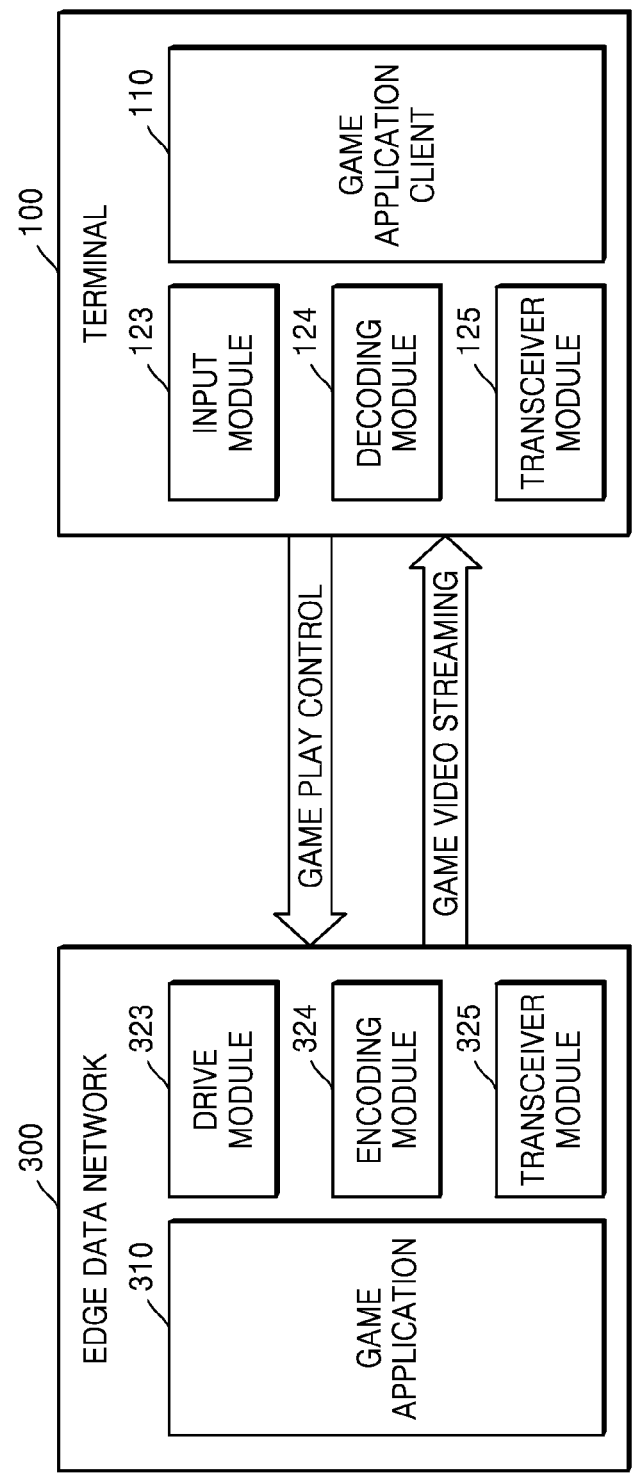
FIG. 4 is a diagram for describing an edge data network for providing a cloud game service and a structure and operation of a terminal using the cloud game service, according to an embodiment of the disclosure.

FIG. 4 is a diagram for describing an edge data network for providing a cloud game service and a structure and operation of a terminal using the cloud game service, according to an embodiment of the disclosure.

When a terminal 100 requests a cloud game service, an edge data network configuration server (not shown) determines an edge data network 300 for providing the cloud game service to the terminal 100 and distribute the cloud game service to the edge data network 300.

Referring to FIG. 4, the edge data network 300 may include a drive module 323, an encoding module 324, a transceiver module 325, and a game application 310. A module may be hereinafter understood as an independent function of operating a device or part of the independent function and may be implemented as hardware or software.

The drive module 323 of the edge data network 300 is a module for driving the game application 310 and may handle a control signal received from the terminal 100 when a game is actually driven. The encoding module 324 may encode (code or compress) video and audio data of the driven game by using a codec. The transceiver module 325 of the edge data network 300 may convert encoded video and audio data streams into network packets and transmit the network packets to the terminal 100, and receive a game control signal from the terminal 100.

Referring to FIG. 4, the terminal 100 may include an input module 123, a decoding module 124, a transceiver module 125, and a game application client 110. The transceiver module 125 of the terminal 100 may transmit a game control signal input by a user to the edge data network 300, receive a packet from the edge data network 300, and convert the packet into a decodable form. The decoding module 124 decodes (or descrambles) data transmitted from the transceiver module 125 and outputs the decoded data through an output module, e.g., a display and a speaker, of the terminal 100. The input module 123 obtains a game control signal input through an input device, such as a keyboard, a mouse, or a touch panel, which is connected to the terminal 100.

When a service is moved to a target edge data network from a source edge data network due to a handover of the terminal 100, the terminal 100 needs to be reconnected to the target edge data network. In a service movement method of the related art, an entire application process executed in a source edge data network is copied to a target edge data network and only a status of a certain user cannot be updated even in the case of a service (e.g., a multi-player game service) in which statuses of multiple users are reflected.

According to the disclosure, when a terminal is handed over from a source edge data network to a target edge data network, a method of reconnecting to the target edge data network and a method of preventing disconnection in service interactions (e.g., game streaming control, a virtual-reality (VR) service line-of-sight information, an augmented-reality (AR) service location information, etc.) due to reconnection are suggested.

Figure 5:
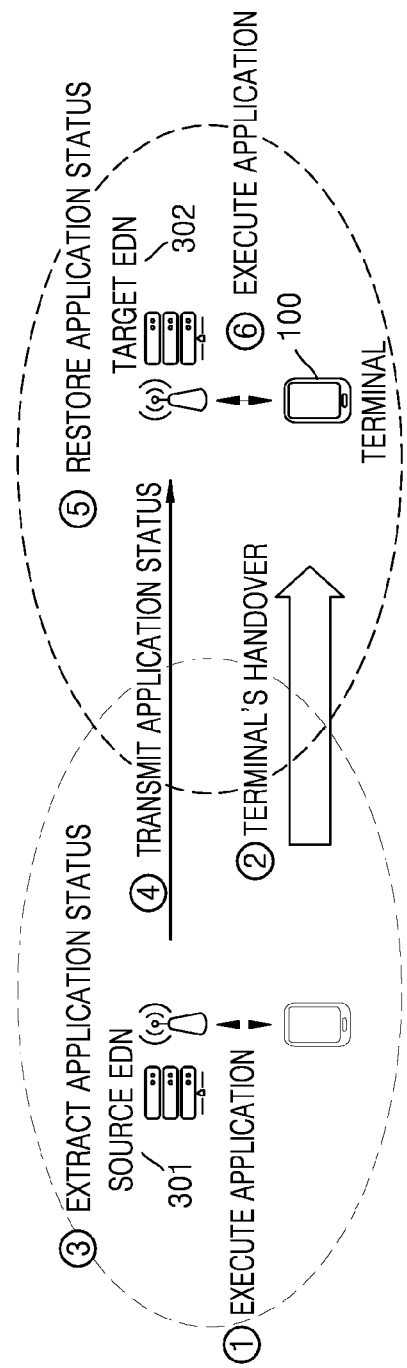
FIG. 5 is a diagram for describing an operation of a terminal to perform a handover in a network environment for supporting a MEC service, according to an embodiment of the disclosure.

FIG. 5 is a diagram for describing an operation of a terminal to perform a handover in a network environment for supporting a MEC service according to an embodiment of the disclosure.

Referring to FIG. 5, a network environment supporting an MEC service may include a source edge data network 301, a target edge data network 302, and a terminal 100.

When the terminal 100 connected to the source edge data network 301 through a base station requests the source edge data network 301 to provide an MEC service, the source edge data network 301 executes an application for providing the MEC service. When a service handover occurs in the target edge data network 302 due to movement of the terminal 100, it is necessary to migrate the MEC service from the source edge data network 301 to the target edge data network 302 and synchronize a service status so as to continuously provide the MEC service to the terminal 100. For service migration, the source edge data network 301 extracts and obtains information about the service status and transmits the obtained information about the service status to the target edge data network 302. The target edge data network 302 receiving the information about the service status may restore the service status and execute an application that provides a service to provide the MEC service to the handed-over terminal 100.

In such a case, a connection address (e.g., an IP address) is changed due to a change of an edge data network to which the terminal 100 is connected and thus a process of reconnecting the terminal 100 to the target edge data network 302 and synchronizing a reconnection status is needed. When a MEC service provided to the terminal 100 is a cloud game service, and particularly, a multi-user cloud game, user information of the handed-over terminal 100 should be synchronized to ensure service continuity. However, only information of a certain user cannot be synchronized according to the related art of migrating a service by copying entire context information (e.g., memory, a CPU, a register, etc.) for an application process. Therefore, in order to provide a multi-user service seamlessly, a process of individually storing and synchronizing information of a certain user, and particularly, context information (e.g., control status information, etc.) of each user is required.

Figure 6:
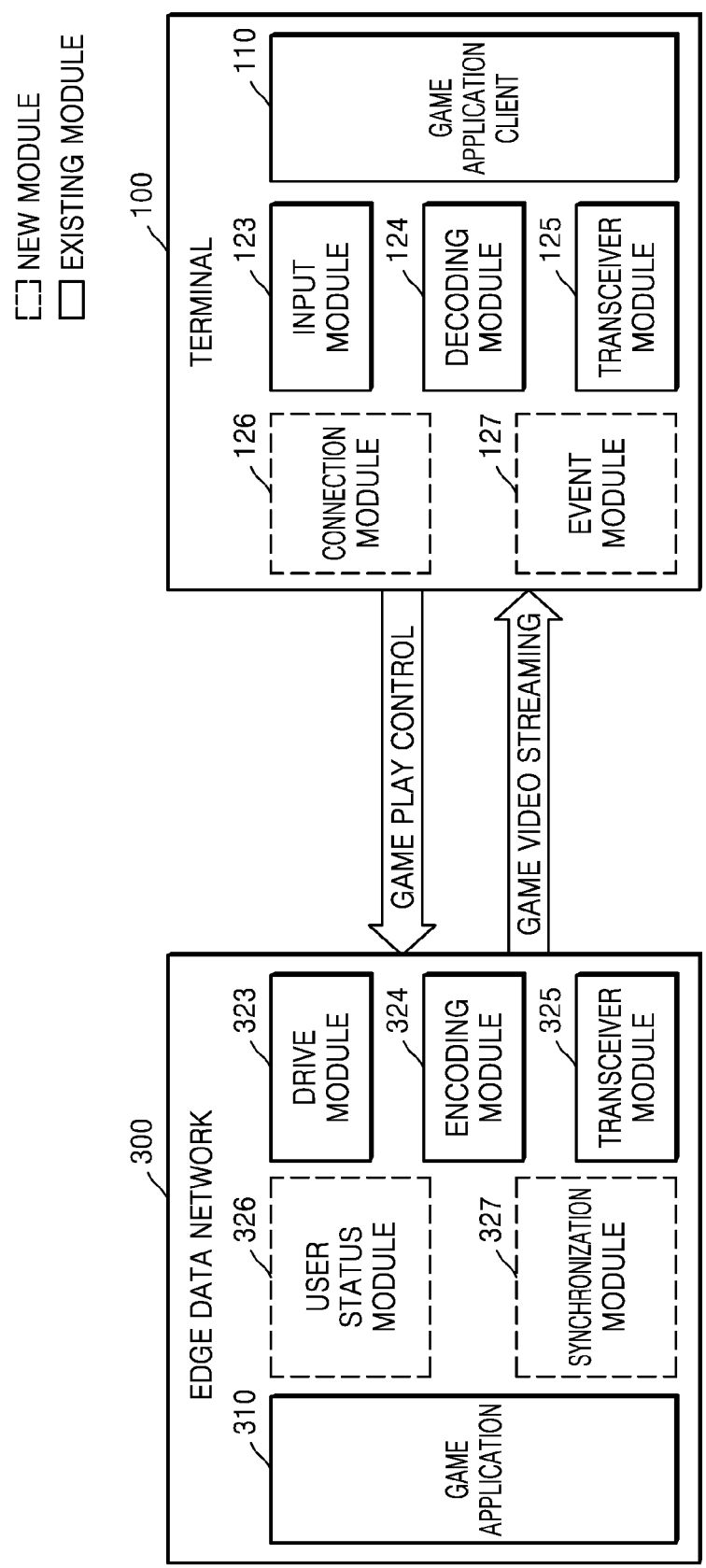
FIG. 6 is a diagram for describing an edge data network for providing a cloud game service and a structure and operation of a terminal using the cloud game service, according to an embodiment of the disclosure.

FIG. 6 is a diagram for describing an edge data network for providing a cloud game service and a structure and operation of a terminal using the cloud game service, according to an embodiment of the disclosure.

A configuration and operations that are the same as those of the embodiment of the disclosure described above with reference to FIG. 4 will be omitted herein. Referring to FIG. 6, an edge data network 300 may include a drive module 323, an encoding module 324, a transceiver module 325, and a game application 310 and may further include a user status module 326 and a synchronization module 327.

The user status module 326 may define a user status (e.g., the location or energy of a game character, etc.) and provide an application programming interface (API) accessible to an application to store and manage user-specific status information in a separate space. In this case, the user status module 326 may manage a user' status information by matching the user status information with user identification information and connection information (e.g., IP-based session information) between the edge data network 300 and the terminal 100.

When a terminal 100 is handed over from a target edge data network from a source edge data network, the synchronization module 327 of the source edge data network may copy execution statuses of the application 310, the drive module 323, the encoding module 324, and the transceiver module 325 of the source edge data network and transmit information about the execution statuses of these modules to the target edge data network. The target edge data network receiving the information about the execution statuses of the modules from the source edge data network may synchronize and restore the statuses of the modules, based on the information about the execution statuses.

In addition, the synchronization module 327 of the source edge data network may transmit user-specific status information of the user status module 326 of the source edge data network to the target edge data network. The target edge data network receiving the user-specific status information from the source edge data network may synchronize and restore user-specific status information based on the received user-specific status information.

A method of synchronizing various types of information by the source edge data network and the target edge data network will be described in detail below.

Referring to FIG. 6, the terminal 100 may include an input module 123, a decoding module 124, a transceiver module 125, and a game application client 110 and may further include a connection module 126 and an event module 127.

The connection module 126 may manage connection with the edge data network 300 according to a connection status event between the terminal 100 and the edge data network 300 and a service policy.

When a connection error occurs, the event module 127 may perform a subsequent operation according to information about a cause of the connection error received from the synchronization module 327 of the edge data network 300.

Figure 7:
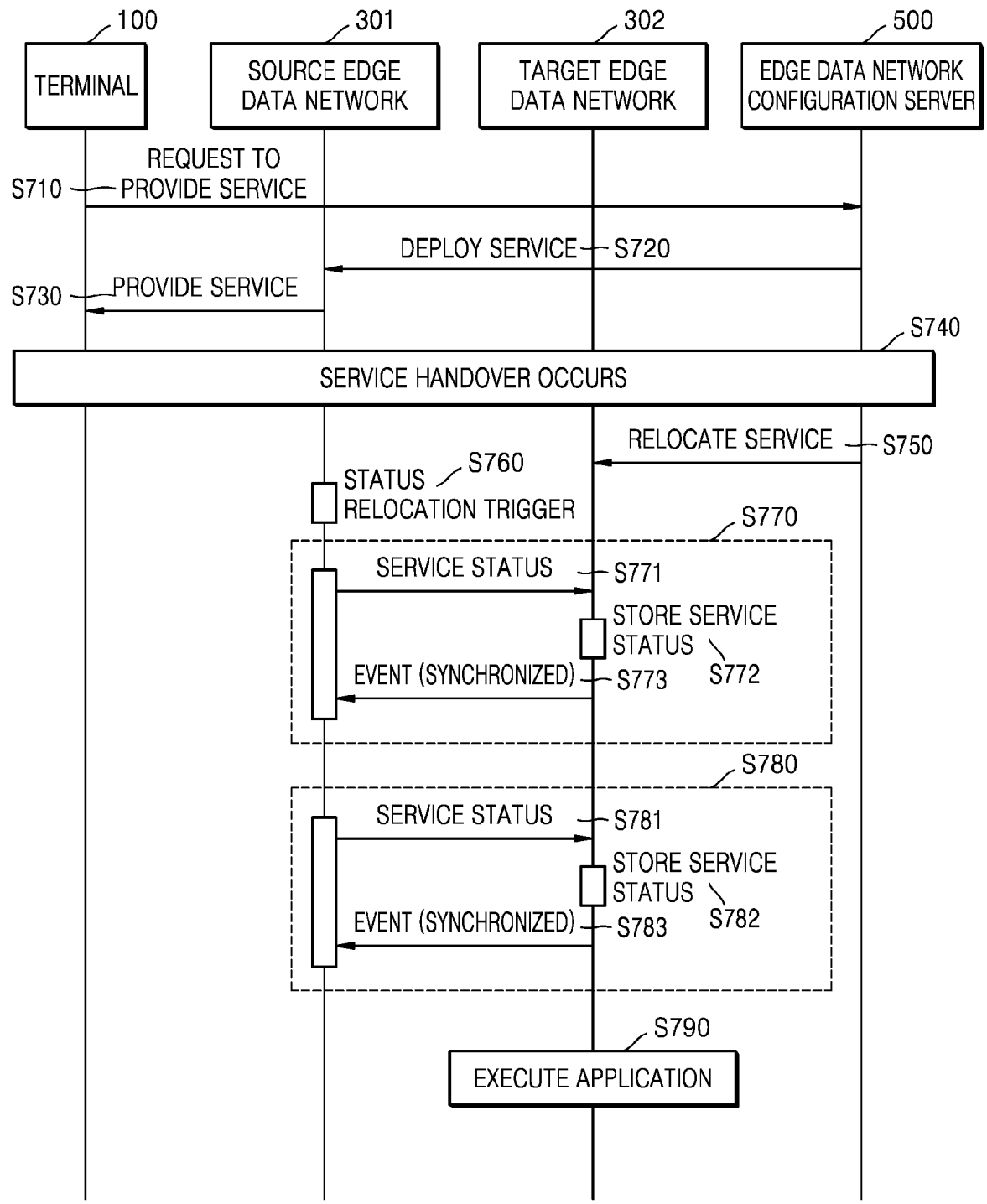
FIG. 7 is a flowchart of a method of providing a MEC service to a terminal, the method performed by a MEC service providing system, according to an embodiment of the disclosure.

FIG. 7 is a flowchart of a method of providing a MEC service to a terminal, the method performed by a MEC service providing system, according to an embodiment of the disclosure.

Referring to FIG. 7, a system that provides a MEC service to a terminal may include a terminal 100, a source edge data network 301, a target edge data network 302, and an edge data network configuration server 500.

According to an embodiment of the disclosure, the terminal 100 may include an application client and an edge enabler client, and the source edge data network 301 and the target edge data network 302 may each include an edge application, an edge enabler server, etc.

According to an embodiment of the disclosure, the edge data network configuration server 500 may refer to an MMP server or a DNS server.

A set-up operation of providing an edge computing service to the terminal 100 by the source edge data network 301 may include requesting by the terminal 100 to provide the edge computing service (S710), selecting by the edge data network configuration server 500 an edge data network for providing the edge computing service and deploying the edge computing service (S720), providing the edge computing service by the source edge data network 301 (S730).

In operation 710, the terminal 100 may execute an application client, generate APP context, and transmit a request to provide the edge computing service to the edge data network configuration server 500.

The terminal 100 may execute the application client for an application that provides a service. The application client may refer to an application for providing the edge computing service to the terminal 100. For example, the application client may refer to an application that provides at least one of a cloud game (game streaming) service, a drone control service, an augmented reality (AR) content providing service, a virtual reality (VR) content providing service, a game content providing service, a broadcast content providing service, a high-capacity media content providing service, an artificial intelligence (AI) operation (image object recognition or language recognition) service or an autonomous driving information providing service.

According to an embodiment of the disclosure, when the terminal 100 executes the application client, the application client may transmit information indicating that the application client 110 has been executed to the edge enabler client. Alternatively, the edge enabler client may detect the execution of the application client (not shown).

When the edge enabler client identifies the execution of the application client, the terminal 100 and the edge data network configuration server 500 may generate APP context (or application context).

The generation of the APP context is a procedure of requesting to join an available application or to instantiate a new application. The generation of the APP context is part of an application instantiation process, and an edge system generates related APP context to maintain and manage the lifetime of the application.

According to an embodiment of the disclosure, the APP context may include unique application instance information such as a unique identifier (ID) in the edge system and an address (URI) provided from a client outside the edge system to interact with the application.

According to an embodiment of the disclosure, the APP context is information about an effective application client in the edge system, and may refer to a reference data set related to an application instance which identifies an application instance, enables life cycle management, and is used to be connected with a device application. For example, the APP context may include information about an application supporting MEC-based data transmission among applications installed in the terminal 100, an ID of the application client, information related to mobility of the terminal 100, life cycle information of the application, information about a status of the terminal 100, information obtained using a sensor, information about network performance, or the like. The edge enabler client may transmit a message requesting to generate APP context to the edge data network configuration server 500, and the edge data network configuration server 500 may generate APP context, based on APP context data received from the terminal 100.

According to an embodiment of the disclosure, the edge data network configuration server 500 may receive a message requesting address information of the edge application from the terminal 100. According to an embodiment of the disclosure, the message requesting the address information of the edge application may be understood as a message requesting, by the edge data network configuration server 500, the edge data network 301 to distribute an edge application corresponding to the application client after the terminal 100 transmits a message requesting to transmit a message requesting to generate APP context related to the application client to the edge data network configuration server 500 (or an MEC management proxy (MMP)). In an embodiment of the disclosure, the message requesting to generate the APP context may correspond to the message requesting the address information.

According to an embodiment of the disclosure, the APP context may be generated by the application client or the edge enabler client of the terminal 100. In this case, the edge enabler client may transmit the generated APP context to the edge data network configuration server 500.

According to an embodiment of the disclosure, the edge enabler client may request the edge data network configuration server 500 to select an edge data network.

According to an embodiment of the disclosure, the edge enabler client may transmit to the edge data network configuration server 500 a message requesting to select an edge data network for providing the application client with an edge computing service.

In an embodiment of the disclosure, the message requesting to select an edge data network may include information about the terminal 100, information related to a preferred network protocol of the application client, information related to a user of the terminal 100, and the like. The information about the terminal 100 may include a position of the terminal 100, service requirements/environment configuration (preference) of the terminal 100, information about connectivity of the terminal 100, and the like.

In operation 720, the edge data network configuration server 500 receiving the request to provide the edge computing service from the terminal 100 may select an edge data network (or the source edge data network 301) for providing the edge computing service and deploy a service in the selected edge data network.

According to an embodiment of the disclosure, the edge data network configuration server 500 may select an optimal edge data network, based on the APP context and a certain network criterion.

In operation 730, the source edge data network 301 may provide the deployed service to the terminal 100.

The edge data network configuration server 500 may allocate the generated APP context or APP context transmitted from the terminal 100 to the edge enabler server of the source edge data network 301 so as to allow the source edge data network 301 to provide the terminal 100 with the edge computing service.

The edge enabler server may request the edge application server to execute the edge application.

According to an embodiment of the disclosure, the edge application server may refer to an application server (application software for performing a server function in a cloud) in an edge hosting environment.

According to an embodiment of the disclosure, the edge application server may execute an edge application corresponding to the application client, based on the APP context, for the application client, allocated by the edge data network configuration server 500.

Information about the edge application is transmitted from the edge enabler server to the application client.

According to an embodiment of the disclosure, the information about the edge application may include address information of the edge application server distributed to at least one edge data network. For example, the address information of the edge application server may be indicated using an Internet Protocol (IP), a Uniform Resource Locator (URL) or a Fully Qualified Domain Name (FQDN) format.

The edge enabler server may transmit a message including the address information of the edge application server to the edge data network configuration server 500.

The edge data network configuration server may transmit the edge application information transmitted from the edge enabler server to the edge application client, and the edge enabler client may transmit the edge application information received from the edge data network configuration server 500 to the application client.

The application client of the terminal 100 may form a control session using a TCP/IP protocol. For example, the application client may form a control session using an edge application and a TCP/IP protocol, which correspond to each other.

The application client requests a data socket for a data session, and the data socket may form a data session according to a given network protocol policy.

The edge client of the terminal 100 and the edge application of the source edge data network 301 may provide an edge application service. For example, the application client may receive data from the edge application through the formed data session. In addition, the application client may transmit data to the edge application through the formed data session.

In operation 740, as the terminal 100 is moved from a service providing area of the source edge data network 301 to a service providing area of the target edge data network 302, a handover may occur from the source edge data network 301 to the target edge data network 302.

As described above, a service handover of the terminal 100 to the target edge data network 302 from the source edge data network 301 may be understood as a technique for changing an edge data network providing a service to the terminal 100 from the source edge data network 301 to the target edge data network 302. The handover of the terminal 100 to the target edge data network 302 may be understood as performing a process of changing an edge data network providing a service to the terminal 100 from the source edge data network 301 to the target edge data network 302.

In operation 750, the edge data network configuration server 500 may relocate a service from the source edge data network 301 to the target edge data network 302.

In operation 760, the source edge data network 301 identifying a service handover may trigger context relocation. According to another embodiment of the disclosure, the terminal 100 identifying the occurrence of the handover may trigger context relocation to transmit a context synchronization request to the target edge data network 302 and the source edge data network 301 (not shown).

When context relocation is triggered in operation 760, the source edge data network 301 and the target edge data network 302 perform service status (service context) synchronization in operation 770 and perform user status (user context) synchronization in operation 780.

In operation 771, the source edge data network 301 may transmit application status information to the target edge data network 302.

The application status information may represent a state in which an application, a drive module, an encoding module, and a transmission module are executed by the source edge data network 301. For example, the application status information may include information about an application that provides a service and information about a service component.

The target edge data network 302 may store information about a service status received from the source edge data network 301 in operation 772, and transmit an event message indicating completion of service status synchronization to the source edge data network 301 in operation 773.

In operation 781, the source edge data network 301 may transmit information about a user status to the target edge data network 302.

The user status may be understood as statuses (e.g., positions in a game, energy levels, etc.) of all users who are using the service and are managed by the user status module of the source edge data network 301. In this case, the user status may be included as part of user information, and the user information may include user identification information (e.g., user ID or account information), connection information (e.g., session ID), user status information, and a user input (e.g., a game control input).

The target edge data network 302 may store the information about the user status received from the source edge data network 301 in operation 782, and transmit an event message indicating completion of user status synchronization to the source edge data network 301 in operation 783.

In operation 790, the target edge data network 302 may execute the application, based on the stored application status and user status.

Figure 8:
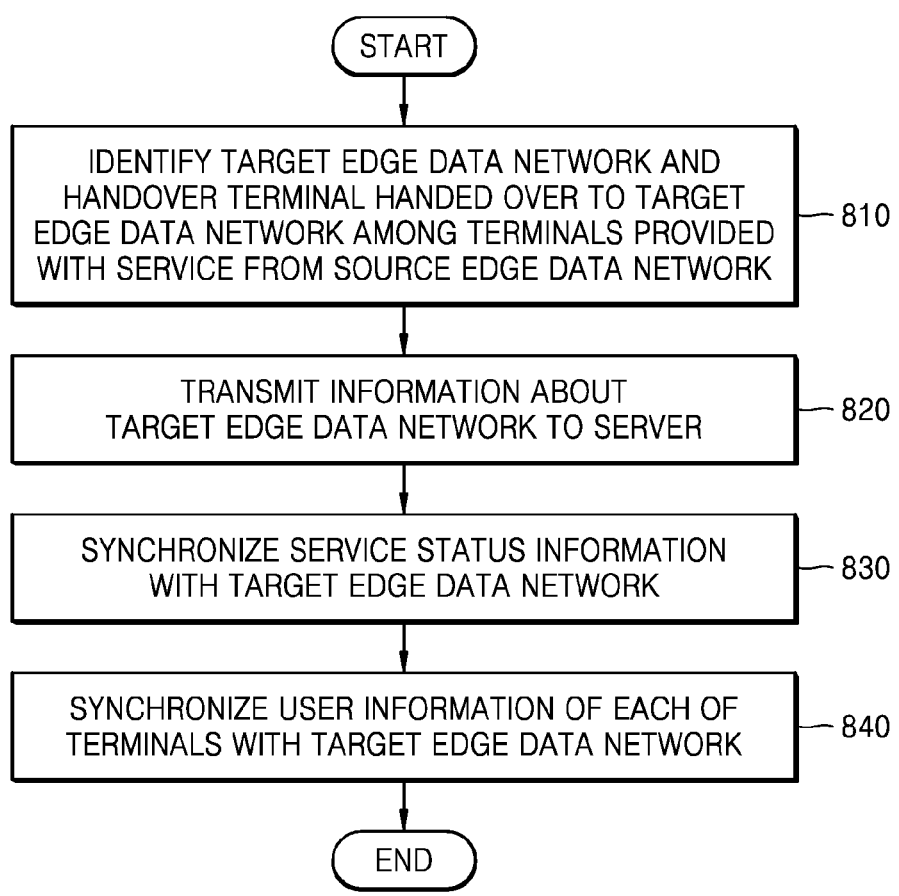
FIG. 8 is a flowchart of a method of providing a service to a terminal, the method performed by a source edge data network, according to an embodiment of the disclosure.

FIG. 8 is a flowchart of a method of providing a service to a terminal, the method performed by a source edge data network, according to an embodiment of the disclosure.

In FIG. 8, an assumption is made that a terminal moves to a service area of a target edge data network while the terminal is provided with a service in a service area of a source edge data network and thus a service handover occurs from the source edge data network to the target edge data network. When the service handover occurs, the source edge data network may transmit information about the target edge data network to the terminal to allow the terminal to be connected to the target edge data network. In addition, the source edge data network may transmit information about a service status or an application status to the target edge data network so as to provide a service continuously to the terminal in the target edge data network.

When a service that uses information about multiple user (e.g., a multi-user game) is currently provided to a terminal, the source edge data network and the target edge data network may share information about multiple users using the service to allow the users to seamlessly use the service in the same state as before a handover occurs.

In the following description of FIG. 8, a detailed description of parts that are the same as in FIG. 7 will be omitted.

In operation 810, a source edge data network may identify a target edge data network and a handover terminal handed over to the target edge data network among a plurality of terminals that are currently provided with a service from the source edge data network.

In operation 820, the source edge data network may transmit information about the identified target edge data network to a server. In this case, the server may be an edge data network configuration server.

According to an embodiment of the disclosure, the information about the target edge data network may include address information of an edge application server. For example, the address information of the edge application server may be indicated using an IP, a URL or a FQDN format. The edge data network configuration server receiving the information about the target edge data network from the source edge data network may deploy a service in the target edge data network.

A process of deploying a service in the edge data network is specified in the edge computing related communication standard (e.g., 3GPP or EDGE), and a detailed description thereof is omitted herein.

According to an embodiment of the disclosure, the source edge data network may request a handover terminal to connect to the target edge data network.

In operation 830, the source edge data network may synchronize status information of an application, for providing a service with the target edge data network.

As described above, in order to seamlessly provide a service to a terminal through a handover, the source edge data network and the target edge data network may share or synchronize statuses of the service and the application so that a service that is currently provided to the terminal from the source edge data network may be provided by the target edge data network.

In operation 840, the source edge data network may synchronize user information for each of a plurality of terminals with the target edge data network.

When a service that is provided to a terminal is a service (e.g., a multi-user game) used by multiple connected users, the source edge data network and the target edge data network may share information about the multiple connected users to allow seamless use of the service in the same state as before a handover occurs.

User information for each of a plurality of terminals may include user identification information (e.g., user ID or account information), connection information (e.g., session ID), user status information, and a user input. The user status information is information about a status of a user utilizing a service and may include, for example, information about the location or energy of a game character. The connection information may be updated when the terminal connected to the source edge data network is reconnected to the target edge data network due to a handover.

According to an embodiment of the disclosure, the user information may include information about the terminal. The information about the terminal may include identification information (e.g., UUID) of a user' terminal or the connection information (e.g., MAC address or IP address, etc.) of the terminal.

Figure 9:
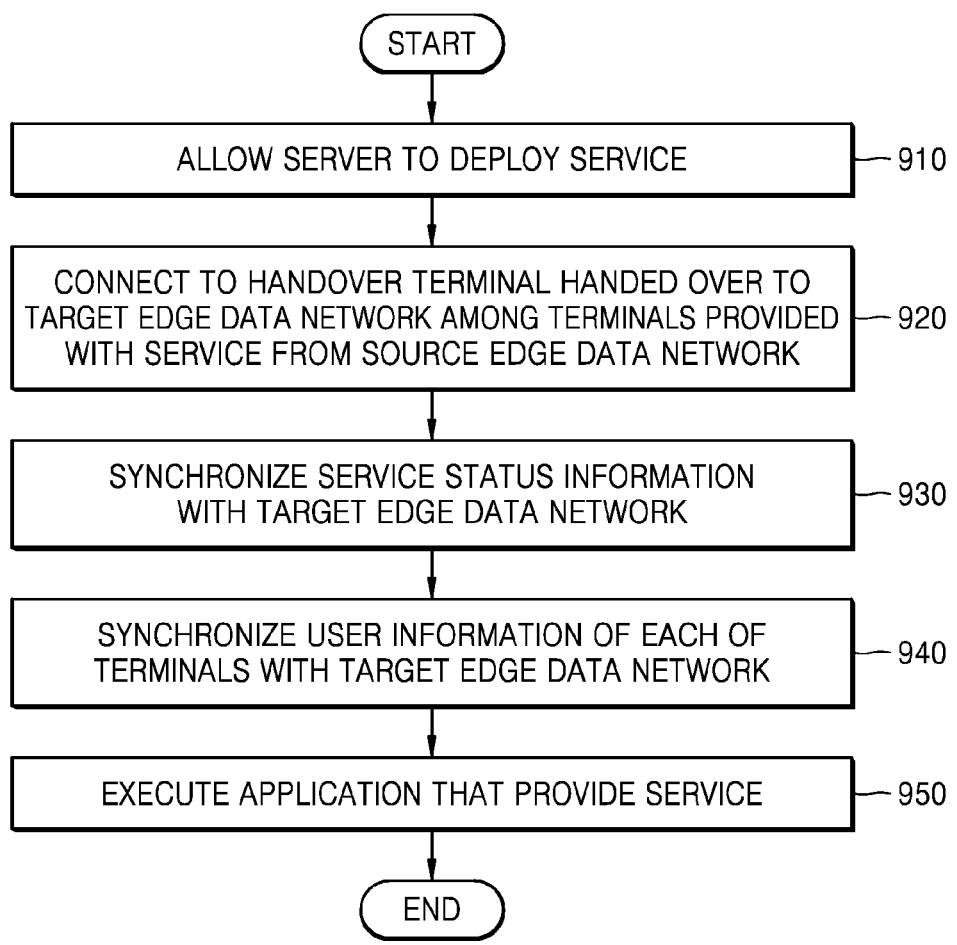
FIG. 9 is a flowchart of a method of providing a service to a terminal, the method being performed by a target edge data network, according to an embodiment of the disclosure.

FIG. 9 is a flowchart of a method of providing a service to a terminal, the method performed by a target edge data network, according to an embodiment of the disclosure.

Similar to FIG. 8, it is assumed in FIG. 9 that a terminal is moved to a service area of a target edge data network while the terminal is provided with a service in a service area of a source edge data network and thus a service handover occurs from the source edge data network to the target edge data network.

The source edge data network may identify the target edge data network and a handover terminal handed over to the target edge data network among a plurality of terminals that are currently provided with a service from the source edge data network, and transmit information about the identified target edge data network to a server.

According to an embodiment of the disclosure, the information about the target edge data network may include address information of an edge application server. For example, the address information of the edge application server may be indicated using an IP, a URL or a FQDN format.

In the following description of FIG. 9, a detailed description of parts that are the same as in FIGS. 7 and 8 will be omitted.

In operation 910, a server may deploy a service in a target edge data network.

In this case, the server may be an edge data network configuration server. As described above, the edge data network configuration server receiving information about the target edge data network from the source edge data network may deploy a service in the target edge data network.

In operation 920, the target edge data network may be connected to a handover terminal.

In this case, the handover terminal refers to a terminal handed over to the target edge data network among a plurality of terminals that are provided with a service from the source edge data network.

According to an embodiment of the disclosure, the source edge data network may request the handover terminal to connect to the target edge data network, and the handover terminal receiving the request to connect to the target edge data network may be connected to the target edge data network.

In operation 930, the target edge data network may synchronize status information of an application that provides the service with the source edge data network.

In operation 940, the target edge data network may synchronize the source edge data network and user information for each of a plurality of terminals with the source edge data network.

In operation 950, the target edge data network may execute the application.

Figure 10:
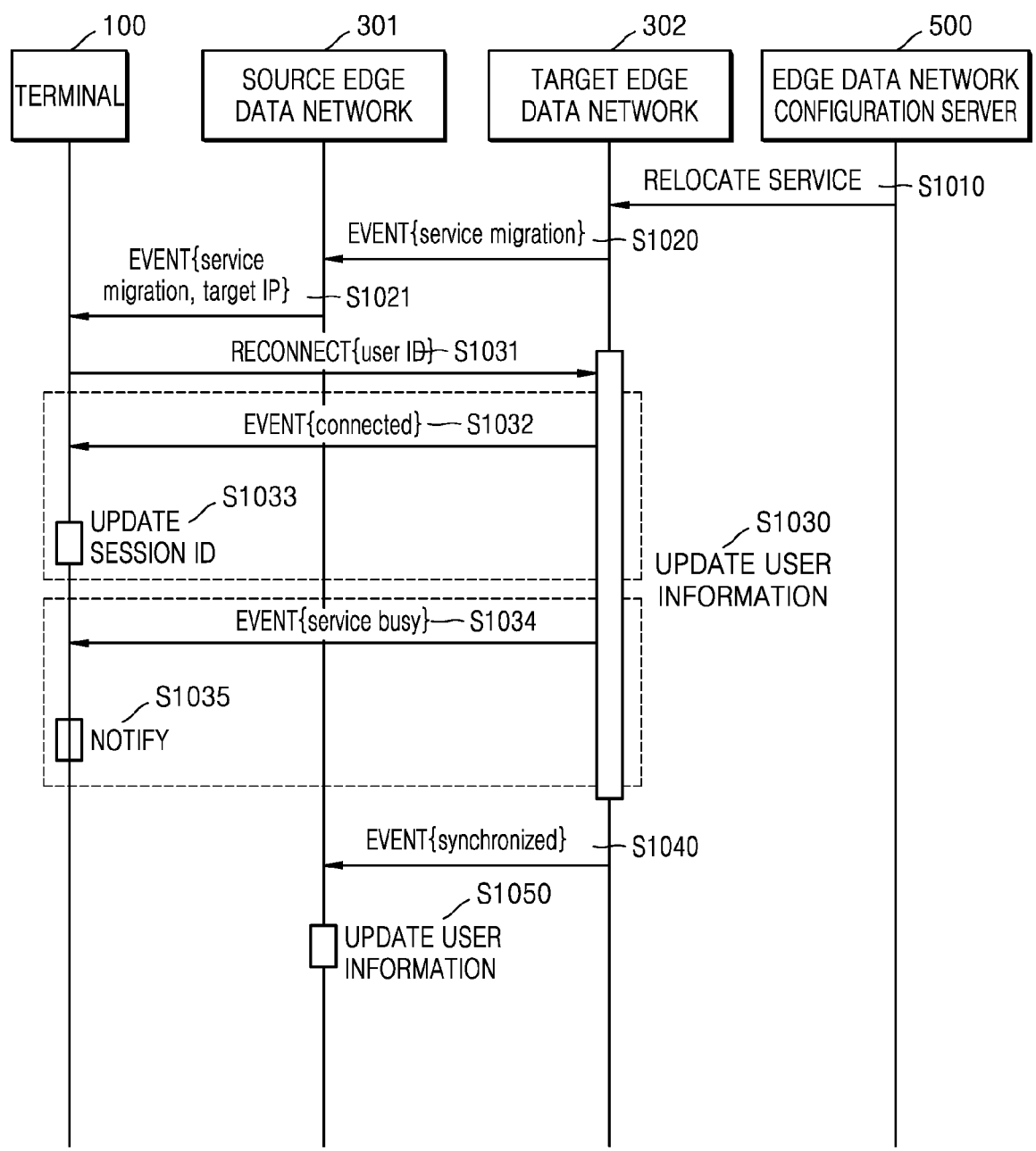
FIG. 10 is a flowchart of a method of providing a MEC service to a terminal, the method performed by a MEC service providing system, according to another embodiment of the disclosure.

FIG. 10 is a flowchart of a method of providing a MEC service to a terminal, the method performed by a MEC service providing system, according to another embodiment of the disclosure.

FIG. 10 illustrates a process of connecting a terminal to a target edge data network after a service handover occurs from a source edge data network to the target edge data network. In the following description of FIG. 10, a detailed description of parts that are the same as in FIGS. 7 to 9 will be omitted.

In operation 1010, an edge data network configuration server 500 may relocate a service from a source edge data network 301 to a target edge data network 302.

In operation 1020, the target edge data network 302 in which the service is relocated by the server may transmit an event message indicating a service migration to the source edge data network 301.

In operation 1021, the source edge data network 301 receiving the event message indicating the service migration from the target edge data network 302 may transmit an event message including address information of the target edge data network 302 to the terminal 100. According to another embodiment of the disclosure, the target edge data network 302 may directly transmit the event message including the address information thereof to the terminal 100 (not shown).

Operation 1030 is a process of updating user information by the target edge data network 302 receiving a reconnect request from the terminal 100. Specifically, in operation 1031, the terminal 100 may request to reconnect to the target edge data network 302, based on the address information of the target edge data network 302 received from the source edge data network 301.

When the connection is successful, in operation 1032, the target edge data network 302 may transmit an event message indicating a connection success to the terminal 100, and in operation 1033, the terminal 100 may update an IP of the connected edge data network as an IP of the target edge data network 302.

When the connection fails, in operation 1034, the target edge data network 302 may transmit an event message indicating a failure of the connection to the terminal 100, and in operation 1035, the terminal 100 may record a notification of the failure of the connection.

When the updating of the user information (operation 1030) is completed, in operation 1040, the target edge data network 302 may transmit an event message indicating completion of user information synchronization to the source edge data network 301.

In operation 1050, the source edge data network 301 completes the updating of the user information.

For example, it is assumed that a user B performs a handover to the target edge data network 302 while a user A and the user B use a game streaming service from the source edge data network 301. The source edge data network 301 identifying the handover transmits information about the target edge data network 302 to a terminal of the user B so as to allow the terminal of the user B to connect to the target edge data network 302.

Table 1 below shows user information stored in the source edge data network 301 before reconnection.

TABLE 1

| User ID | Session | Context |
|---------|---------|---------|
| A | 10 | Data_A |
| B | 20 | Data_B |

Referring to Table 1, before reconnection, the user A is connected to the source edge data network 301 with a session ID 10, and the user B is connected to the source edge data network 301 with a session ID 20.

When the terminal of the user B is reconnected to the target edge data network 302, the target edge data network 302 may assign a new session ID 30 to the user B and update the user information.

Table 2 below shows user information updated in the target edge data network 302.

TABLE 2

| User ID | Session | Context |
|---------|---------|---------|
| A | ~~10~~ | Data_A |
| B | 30 | Data_B |

Referring to Table 2, before reconnection, the user A is connected to the target edge data network 302 with the session ID 10, and the user B is connected to the source edge data network 301 with a session ID 30. In addition, a mark may be added to information about the user A to indicate that the user A is not a user provided with a service from the target edge data network 302.

The target edge data network 302 completing the updating of the user information may the updated user information to the source edge data network 301 to synchronize the updated user information, and the source edge data network 301 may updated user information thereof, based on user information of the target edge data network 302.

Table 3 below shows user information updated in the source edge data network 301.

TABLE 3

| User ID | Session | Context |
|---|---|---|
| A | 10 | Data_A |
| B | 2̶0̶ | Data_B |

Referring to Table 3, the source edge data network 301 may identify from Table 1 that a mark is added to information about the user B to indicate that the user B is not a user provided with a service from the source edge data network 301.

Figure 11:
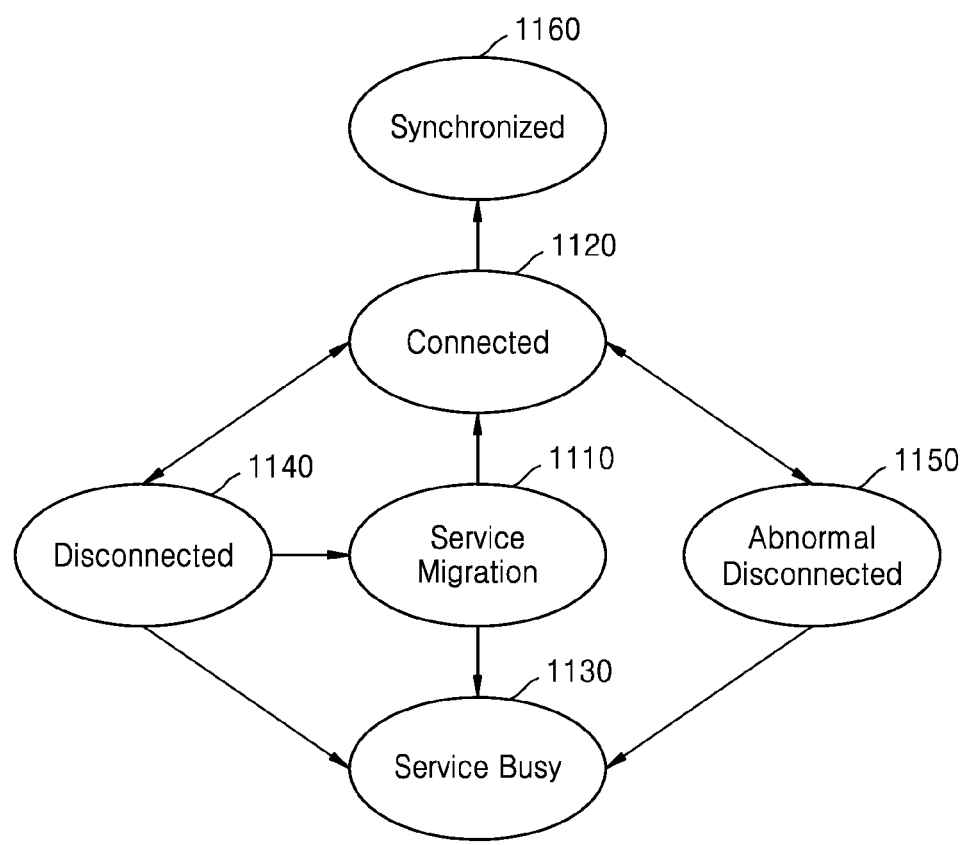
FIG. 11 illustrates a reconnection state machine according to an embodiment of the disclosure.

FIG. 11 illustrates a reconnection state machine according to an embodiment of the disclosure.

Referring to FIG. 11, a connection event state between an edge data network and a terminal includes a service migration state 1110, a connected state 1120, a service busy state 1130, a disconnected state 1140, an abnormal disconnected state 1150, and a synchronized state 1160.

Table 4 below shows the types of connection event states and processing policies.

TABLE 4

| Event | Policy | ADDITIONAL INFORMATION |
|---|---|---|
| Connected | NOTIFY USER (INITIALIZATION/RECONNECTION SUCCESS) STORE CONNECTION IP | N/A |
| Disconnected | NOTIFY USER (DISCONNECTED) DELETE CONNECTION IP | N/A |
| Abnormal Disconnected | NOTIFY USER (ABNORMAL DISCONNECTED) AUTOMATICALLY RECONNECTED THREE TIMES | N/A |
| Service Busy | NOTIFY USER (CONNECTION FAILURE) | N/A |
| Service Migration | AUTOMATICALLY RECONNECT TO TARGET SERVER CHANGE CONNECTION IP TO TARGET IP | Target IP |
| Synchronized | COMPLETE CONTEXT SYNCHRONIZATION | N/A |

When the connection event state is the service migration state 1110, the terminal may be automatically reconnected to a target edge data network and a connection IP may be processed to be changed as an IP of the target edge data network.

When the connection event state is the connected state 1120, a user may be informed of a success of connection and a connection IP may be stored. When the connection event state is the service busy state 1130, a user may be informed of a connection failure.

When the connection event state is synchronized state 1160, synchronization between the source edge data network and user information may be completed. When the connection event state is the disconnected state 1140, a user may be informed of disconnection and a connection IP may be deleted, and when the connection event state is changed to the abnormal disconnected state 1150, the user may be informed of abnormal disconnection and reconnection may be automatically attempted a certain number of times.

Figure 12:
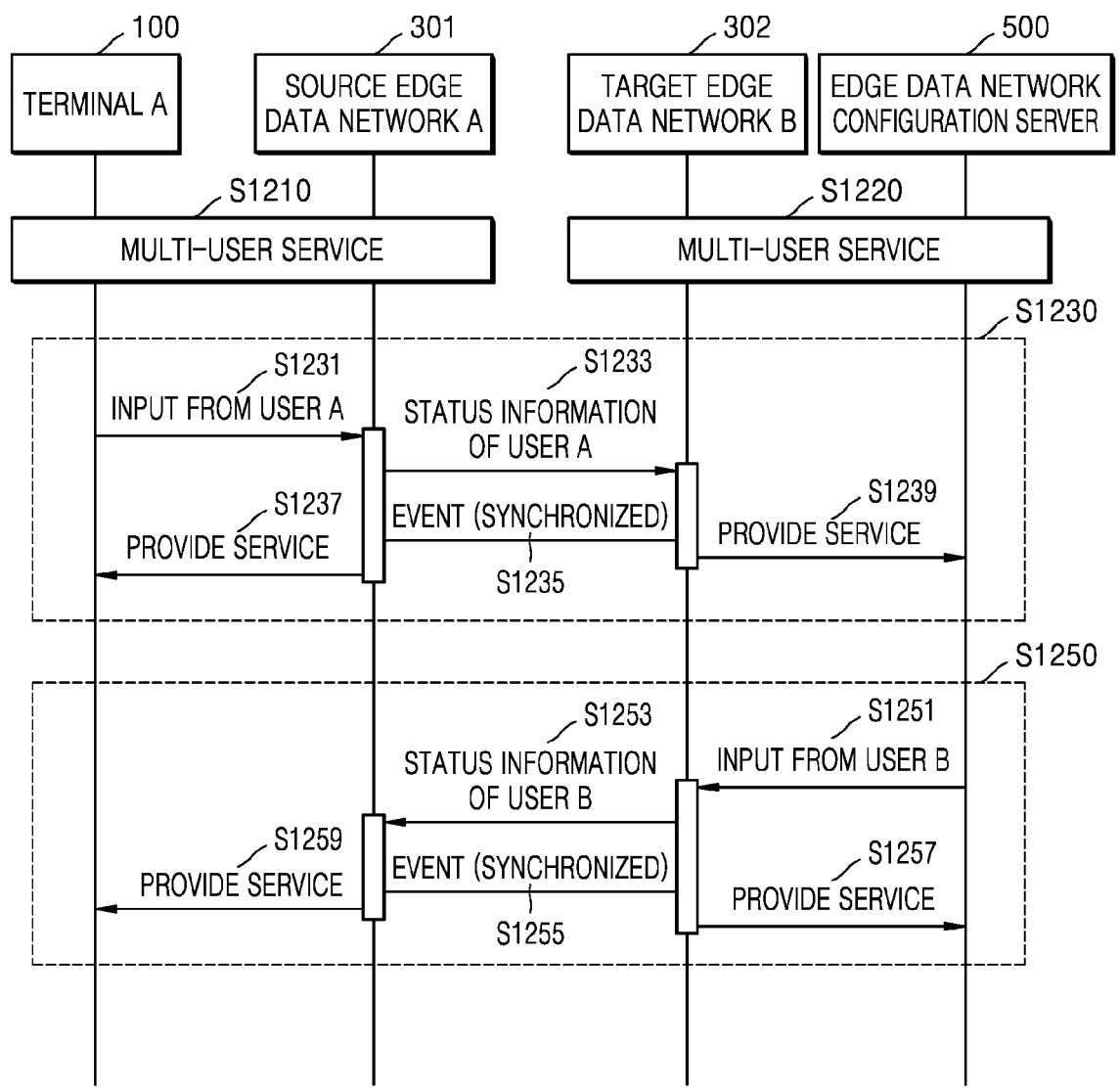
FIG. 12 is a flowchart of a method of providing a MEC service to a terminal, the method performed by a MEC service providing system, according to another embodiment of the disclosure.

FIG. 12 is a flowchart of a method of providing a MEC service to a terminal, the method performed by a MEC service providing system, according to another embodiment of the disclosure.

In FIG. 12, it is assumed that an edge data network A 301 provides a multi-user service (operation 1210) to a terminal A 101 and an edge data network B 302 provides the same multi-user service to a terminal B 102 (operation 1220). This situation may occur when the terminal B 102 is handed over to the edge data network B 302 while both the terminal A 101 and the terminal B 102 use a service from the edge data network A 301, but embodiments of the disclosure are not limited thereto.

For convenience of description, a user of the terminal A 101 and a user of the terminal B 102 will be respectively referred to as a user A and a user B. When the multi-user service used by the terminal A 101 and the terminal B 102 is a multi-player game streaming service, a method of reflecting a change of a user status due to a user input in an application of all users (e.g., the user A and the user B) is needed.

Operation 1230 is a process of synchronizing and updating status information of the user A between the edge data network A 301 and the edge data network B 302 according to a user input (or a control signal) from the terminal A 101.

In operation 1231, the terminal A 101 may transmit an obtained user input to the edge data network A 301. The terminal A 101 may obtain the user input through an input module thereof.

In operation 1233, the edge data network A 301 obtaining the user input from the terminal A 101 may update the status information of the user A to reflect the user input, and transmit user information reflecting the updated status information to the edge data network B 302. In this case, for service quality and system resource control, only user status information or the status information of the user A may be transmitted instead of entire user information, as will be described in detail below.

In operation 1235, the edge data network B 302 obtaining the status information of user A from the edge data network A 301 may update the obtained status information of the user A and transmit an event message reporting completion of synchronization to the edge data network B 302.

In operations 1237 and 1239, the edge data network A 301 and the edge data network B 302 may respectively provide services to the terminal A 101 and the terminal B 102 to reflect the updated status information of the user A.

Operation 1250 is a process of synchronizing and updating status information of the user B between the edge data network A 301 and the edge data network B 302 according to a user input of the terminal B 102.

Operations 1251 to 1259 are the same as operations 1231 to 1239 except subjects thereof and a data flow direction and thus a description thereof is omitted herein.

As described above, when edge data networks providing a multi-user game service perform user information synchronization very frequently, a service response latency may increase and thus a method of optimizing service response latency is needed.

When application status information and user information are not distinguished from each other, the edge data networks should transmit all information related to the service for service synchronization. When user status information is not managed separately, the edge data networks should transmit all user information for service synchronization.

A service response latency due to user information synchronization is determined by a time incurred to transmit user information and a time incurrent to respond to an event message response time and thus may be optimized by minimizing the size of user information data or adjusting a transmission period.

According to an embodiment of the disclosure, only user status information included in user information may be transmitted and synchronized to minimize the size of user information to be transmitted between the edge data networks.

According to an embodiment of the disclosure, the edge data networks may determine a user status information transmission period according to a user input, based on the type of application. In such a case, network resources and computing resources may be efficiently managed by optimizing a transmission period.

Table 5 below shows a synchronization period, the size of data to be transmitted, and a synchronization overhead according to the type of a game application.

TABLE 5

| GAME GENRE | SYNCHRONIZATION PERIOD | SIZE OF DATA TO BE TRANSMITTED | SYNCHRONIZATION OVERHEAD |
| --- | --- | --- | --- |
| FPS (First person shooter) | Every input | <10 KB | <5 ms |
| RTS (Real Time Strategy) | INPUT THREE TIMES OR 100 MS | <30 KB | <10 ms |
| RPG (Role Playing Game) | INPUT FIVE TIMES OR 200 MS | <50 KB | <15 ms |

Referring to Table 5, when an application is a first person shooter (FPS), all user inputs have a significant influence on the control of the application and thus all the user inputs may be synchronized. In this case, the size of data to be transmitted for synchronization may be 10 kB or less and an overhead (or latency) due to the synchronization may be 5 ms or less.

When the application is a real time strategy (RTS), synchronization may be performed for every three user inputs or every 100 ms interval. In this case, the size of data to be transmitted for synchronization may be 30 kB or less and an overhead due to the synchronization may be 10 ms or less.

When the application is a role playing game (RPG), a user input interval may be shorter or a user input may be less important than in the case of the FPS or the RTS and thus synchronization may be performed a smaller number of times (for example, five times) or at a longer time interval (200 ms interval). In this case, the size of data to be transmitted for synchronization may be 50 kB or less and an overhead due to the synchronization may be 15 ms or less.

Figure 13:
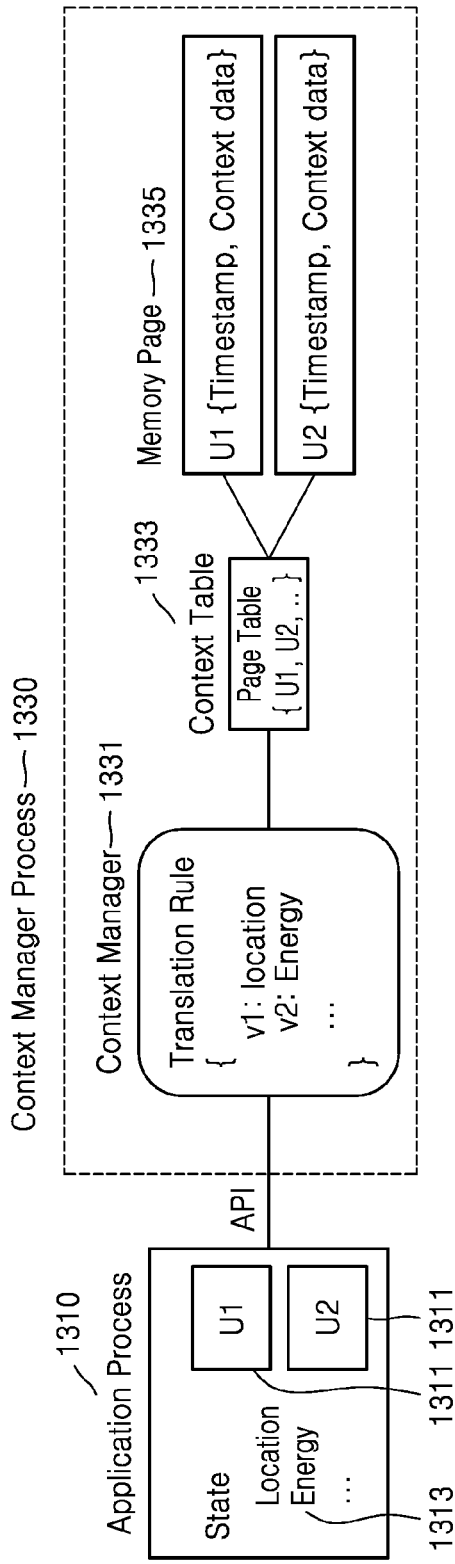
FIG. 13 is a diagram for describing a method of managing user status information, according to an embodiment of the disclosure.

FIG. 13 is a diagram for describing a method of managing user status information, according to an embodiment of the disclosure.

User information may include user identification information, network information, and user status information.

The user identification information may refer to identification information (e.g., user account) of a player using a game service. The network information may include a session ID, and the session ID refers to a connection identification value of a user account assigned to a session of each user to distinguish between multiple users connected to an edge data network.

The session ID includes an ID of an edge data network to which a user terminal is connected, a user account, and an authentication key. The authentication key may be generated from a combination of an ID of a source edge data network and an ID of a target edge data network during a service migration, and may be used to perform authentication for user information synchronization. When the user terminal is connected to a third edge data network, the authentication key included in the session ID does not match an ID of the third edge data network and thus the user information synchronization is not performed.

The user status information may refer to a user-specific data set for status variables defined by an application that provides a service.

The user information may be synchronized between edge data networks according to a service migration method or a service API method.

According to the service API method, synchronization is performed in an application that provides a service. In this case, a method of defining a user status varies according to an application on and thus a user status to be synchronized should be defined and a synchronization function should be implemented at an application development stage. To this end, a platform should provide a data transmission interface available for an application to perform synchronization.

In the case of a real-time interactive service such as game streaming, it is necessary to consider such features because there are various user statuses and a user status may change in real time.

The service migration method may be implemented in a memory dump manner that is generally used for load balancing, failure recovery, etc. in a cloud and at a data center according to a synchronization method provided on the platform. The service migration method may provide a synchronization method of effectively preventing a service delay by providing a user information module for an application on a platform through an SDK, an API or the like. In this case, a memory dump may be minimized as compared to the related art.

In this case, a user information management module may be implemented as a separate process, so that a memory dump may be performed only in the process. An API may be provided in an application process rather than storing a user status in a memory of the application process, so that the user status may be stored and managed in a separate management process, e.g., a memory space of a user status management process.

Referring to FIG. 13, an application process 1310 and a user status information management process 1330 may be connected through an API.

In the application process 1310, state variables (location and energy) 1313 for each of users 1311 U1 and U2 may be defined. An application may transmit a user-specific data set for user status information, i.e., status variables 1313, to the user status information management process 1330 through an API provided from the user status information management process 1330.

In the user status information management process 1330, user status information transmitted from the application process 1310 may be converted according to a translation rule 1331 and user status information of each user may be stored in a memory page 1335 identified through a user status information table 1333.

According to an embodiment of the disclosure, a timestamp for status information may be used to synchronize and update status information of multi-users (or multi-players). For example, only latest status information of each user may be synchronized and updated according to the timestamp or only changes in the memory page 1335 may be synchronized and updated when user information is updated and synchronized.

Figure 14:
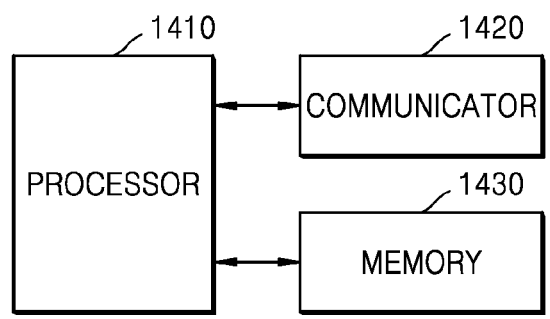
FIG. 14 is a block diagram of an edge data network according to an embodiment of the disclosure.

FIG. 14 is a block diagram of an edge data network according to an embodiment of the disclosure.

The edge data network of FIG. 14 may be substantially the same as the source edge data network 301 or the target edge data network 302 according to the disclosure.

As shown in FIG. 14, the edge data network of the disclosure may include a processor 1410, a communicator 1420, and a memory 1430. However, components of the edge data network are not limited thereto. For example, the edge data network may include more components or only some of the components described above. Alternatively, the processor 1410, the communicator 1420, and the memory 1430 may be embodied together as one chip.

According to an embodiment of the disclosure, the processor 1410 may control a series of processes for operating the edge data network according to the above-described embodiments of the disclosure. For example, the components of the edge data network according to the embodiment of the disclosure may be controlled to allow the edge data network to provide a service to a terminal.

More specifically, the components of the edge data network may be controlled to allow the edge data network to synchronize application status information and user information so as to provide a MEC service seamlessly to the terminal 100. A plurality of processors 1410 may be provided, and the processor 1410 may execute a plurality of instructions (or a program) stored in the memory 1430 so as to provide the MEC service to the terminal 100 without delay due to a handover as described above.

According to an embodiment of the disclosure, the processor 1410 may control a series of processes of operating the edge applications of the edge data networks 301 and 302 and the edge enabler server shown in FIGS. 5 to 13. For example, the edge applications and the edge enabler server may be implemented as a plurality of instructions (or a program). The processor 1410 may execute plurality of instructions (or the program) to perform operations of the edge applications and the edge enabler server.

According to an embodiment of the disclosure, when the edge data network of FIG. 14 is the source edge data network 301, the processor 1410 may identify the handovered terminal 100 among a plurality of terminals connected to the source edge data network 301 and the target edge data network 302, transmit information about the identified target edge data network 302 to a server, synchronize the target edge data network 302 and status information of the service, and synchronize the target edge data network 302 and user information for each of the plurality of terminals.

The handover terminal 100 and the target edge data network 302 may be identified, the information about the identified target edge data network 302 may be transmitted to the server, the target edge data network 302 and status information of an application that provides a service may be synchronized, and the target edge data network 302 and the information for each of the plurality of terminals may be synchronized.

According to an embodiment of the disclosure, when the edge data network of FIG. 14 is the target edge data network 302, the processor 1410 may be provided with a service deployed by a server, be connected to a handover terminal handed over to the target edge data network 302 among a plurality of terminals provided with a service from the source edge data network 301, synchronize the source edge data network 301 and status information of an application that provides a service, synchronize the source edge data network 301 and user information for each of the plurality of terminals, and execute the application.

The communicator 1420 may transmit signals to or receive signals from an external device (e.g., the terminal 100), a network (e.g., a 3GPP network), a server (e.g., the service server 400), or another edge data network. The signals transmitted from and received by the communicator 1420 may include control information and data. The communicator 1420 may include a radio-frequency (RF) transmitter that up-converts and amplifies a frequency of a signal to be transmitted, an RF receiver that low-noise amplifies a received signal and down-converts a frequency of the received signal, and the like. However, the above description is merely intended to provide an example of the communicator 1420, and components of the communicator 1420 are not limited to the RF transmitter and the RF receiver. The communicator 1420 may receive a signal through a wireless channel, output the signal to the processor 1410, and transmit a signal output from the processor 1410 through the wireless channel.

According to an embodiment of the disclosure, the communicator 1420 may transmit data to and receive data from the terminal 100, a 3GPP network, or another edge data network, under control of the processor 1410. For example, the communicator 1420 may request and receive location information of the terminal 100 through the terminal 100 or the 3GPP network. In addition, the communicator 1420 may transmit a message requesting expected data to or receive the message from another edge data network and transmit or receive data related to a service corresponding to the expected data. In addition, the communicator 1420 may transmit data related to the service (e.g., data related to a service received from another edge data network) to the terminal 100.

According to an embodiment of the disclosure, the memory 1430 may store a plurality of instructions (or a program) and data necessary for operations of the edge data network. In addition, the memory 1430 may store control information or data included in a signal transmitted from or received by the edge data network. The memory 1430 may include a storage medium such as a ROM, a RAM, a hard disc, a CD-ROM, and a DVD or a combination of such storage media. Alternatively, a plurality of memories 1430 may be provided. According to an embodiment of the disclosure, the memory 1430 may store a plurality of instructions (or a program) for the edge data network to provide a service to the terminal 100.

The methods according to the embodiments of the disclosure described in the claims or specification of the disclosure may be implemented by hardware, software, or a combination of hardware and software.

When the methods are implemented by software, a non-transitory computer-readable storage medium or a computer program product storing one or more programs (software modules) may be provided. The one or more programs stored in the non-transitory computer-readable storage medium of the computer program product are configured to be executable by one or more processors included in an electronic device. The one or more programs include instructions that cause an electronic device to execute the methods according to the embodiments of the disclosure set forth in the claims or specification.

Such programs (software modules or software) may be stored in a random access memory, a non-volatile memory such as flash memory, a read-only memory (ROM), an electrically erasable programmable ROM (EEPROM), a magnetic disc storage device, a compact disc-ROM (CD-ROM), a digital versatile disc (DVD), other types of optical storage devices, or a magnetic cassette. Otherwise, such programs may be stored in a memory which is a combination of some or all the above storage media. Alternatively, a plurality of such memories may be provided.

The programs may be stored in an attachable storage device accessible via communication networks such as the Internet, an Intranet, a local area network (LAN), a wide LAN (WLAN) or a storage area network (SAN) or a combination thereof. Such a storage device may be connected to a device performing embodiments of the disclosure through an external port. Otherwise, a separate storage device in a communication network may be connected to a device that performs embodiments of the disclosure.

In the disclosure, the term "computer program product" or "computer readable medium" is used to refer to a medium such as a memory, a hard disc installed in a hard disc drive or a signal. The "computer program product" or "computer-readable recording medium" is a means for providing a computer system with software consisting of instructions to set a length of a timer so as to receive omitted data packets, based on a network metric corresponding to a determined event according to the disclosure.

The machine-readable storage medium may be provided in the form of a non-transitory storage medium. Here, the term 'non-transitory storage medium' should be understood to mean a tangible device and to not include a signal (e.g., electromagnetic waves) but is not intended to distinguish between a case in which data is semi-permanently stored in the storage medium and a case in which data is temporarily stored in the storage medium. For example, the 'non-transitory storage medium' may include a buffer in which data is temporarily stored.

In an embodiment of the disclosure, methods according to various embodiments of the disclosure may be provided in a computer program product. The computer program product may be traded as a product between a seller and a purchaser. The computer program product may be distributed in the form of a storage medium (e.g., compact disc read only memory (CD-ROM)) that is readable by devices, may be distributed through an application store (e.g., Play Store™) or directly between two user devices (e.g., smartphones), or may be distributed online (e.g., by downloading or uploading). In the case of an online distribution, at least part of the computer program product (e.g., a downloadable application) may be at least temporarily stored or temporarily generated in a storage medium readable by devices such as the manufacturer's server, a server of an application store, or a memory of a relay server.

In the embodiments of the disclosure described above, each component included in the disclosure is expressed in a singular or plural form according to a presented embodiment of the disclosure. However, singular or plural expressions are appropriately selected according to a situation described for convenience of description and the disclosure is not limited by singular or plural components. Even components expressed in a plural form may be embodied in a singular form or even components expressed in a singular form may be embodied in a plural form.

Although embodiments of the disclosure have been described in the detailed description of the disclosure, various modifications may be made therein without departing from the scope of the disclosure. Therefore, the scope of the disclosure is not limited to the embodiments of the disclosure described herein and should be defined by the claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A method, performed by a source edge data network, of providing a service in a wireless communication system, the method comprising:
    identifying a target edge data network and a handover terminal handed over to the target edge data network among a plurality of terminals provided with the service from the source edge data network;
    transmitting, to a server, information about the identified target edge data network;
    synchronizing status information of an application for providing the service with the target edge data network;
    synchronizing user information for each of the plurality of terminals with the target edge data network; and
    synchronizing user inputs of the plurality of terminals.

2. The method of claim 1, further comprising transmitting, to the handover terminal, a message requesting to reconnect to the target edge data network, and
    wherein the synchronizing of the user information for each of the plurality of terminals comprises:
        receiving a session identification (ID) of a user of the handover terminal from the target edge data network; and
        updating the session ID for the user of the handover terminal.

3. The method of claim 1, wherein the synchronizing of the user information for each of the plurality of terminals comprises:
    synchronizing session identifications (IDs) for edge data networks connected to the plurality of terminals.

4. The method of claim 3, wherein the synchronizing of the user inputs of the plurality of terminals is performed at certain time intervals determined based on a type of the service.

5. The method of claim 3, wherein the synchronizing of the user inputs of the plurality of terminals comprises authenticating a user for each of the plurality of terminals by using an authentication key generated based on an identifier of the source edge data network and an identifier of the target edge data network.

6. The method of claim 3, wherein the synchronizing of the user inputs of the plurality of terminals comprises:
    obtaining the user inputs of the plurality of terminals; and storing the user inputs of the plurality of terminals related to each respective user.

7. A method, performed by a target edge data network, of providing a service in a wireless communication system, the method comprising:
- receiving, from a server, information regarding the service to be deployed;
- connecting to a handover terminal handed over to the target edge data network among a plurality of terminals provided with the service from a source edge data network;
- synchronizing status information of an application for providing the service with the source edge data network;
- synchronizing user information for each of the plurality of terminals with the source edge data network;
- synchronizing user inputs of the plurality of terminals; and
- executing the application.

8. The method of claim 7, wherein the synchronizing of the user information for each of the plurality of terminals comprises transmitting, to the source edge data network, a session identification (ID) of a user of the handover terminal.

9. The method of claim 7, wherein the synchronizing of the user information for each of the plurality of terminals comprises:
- synchronizing session identifications (IDs) for edge data networks to which users of the plurality of terminals are connected.

10. The method of claim 9, wherein the synchronizing of the user inputs of the plurality of terminals is performed at certain time intervals determined based on a type of the service.

11. The method of claim 9, wherein the synchronizing of the user inputs of the plurality of terminals comprises authenticating a user for each of the plurality of terminals by using an authentication key generated based on an identifier of the source edge data network and an identifier of the target edge data network.

12. The method of claim 9, wherein the synchronizing of the user inputs of the plurality of terminals comprises:
- obtaining the user inputs of the plurality of terminals; and
- storing the user inputs of the plurality of terminals related to each respective user.

13. A source edge data network providing a service to a terminal in a wireless communication system, the source edge data network comprising:
- a communicator;
- a memory storing a plurality of instructions; and
- at least one processor configured to execute the plurality of instructions to:
  - identify a target edge data network and a handover terminal handed over to the target edge data network among a plurality of terminals connected to the source edge data network;
  - transmit, to a server, information about the identified target edge data network;
  - synchronize status information of an application for providing the service with the target edge data network;
  - synchronize user information for each of the plurality of terminals with the target edge data network; and
  - synchronize user inputs of the plurality of terminals.

14. The source edge data network of claim 13, wherein the at least one processor is further configured to:
- transmit, to the handover terminal, a message requesting to reconnect to the target edge data network; and
- receive a session identification (ID) of a user of the handover terminal from the target edge data network and update the session ID of the user of the handover terminal so as to synchronize the user information for each of the plurality of terminals.

15. The source edge data network of claim 13, wherein the at least one processor is further configured to synchronize session IDs for edge data networks connected to the plurality of terminals.

16. The source edge data network of claim 15, wherein the at least one processor is further configured to perform the synchronizing of the user inputs of the plurality of terminals at certain time intervals determined based on a type of the service.

17. The source edge data network of claim 15, wherein the at least one processor is further configured to authenticate users of the plurality of terminals by using an authentication key generated based on an identifier of the source edge data network and an identifier of the target edge data network so as to synchronize the user inputs of the plurality of terminals.

18. The source edge data network of claim 15, wherein the at least one processor is further configured to obtain the user inputs of the plurality of terminals and store the user inputs of the plurality of terminals related to each respective user so as to synchronize the user inputs of the plurality of terminals.

19. A non-transitory computer-readable recording medium having recorded thereon a program for executing the method of claim 1 in a computer.

20. A non-transitory computer-readable recording medium having recorded thereon a program for executing the method of claim 7 in a computer.

* * * * *